US010362337B2

(12) United States Patent
Mertens

(10) Patent No.: US 10,362,337 B2
(45) Date of Patent: Jul. 23, 2019

(54) METHODS AND APPARATUSES FOR ENCODING HDR IMAGES

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 36 days.

(21) Appl. No.: 15/327,401

(22) PCT Filed: Jul. 21, 2015

(86) PCT No.: PCT/EP2015/066653
§ 371 (c)(1),
(2) Date: Jan. 19, 2017

(87) PCT Pub. No.: WO2016/020189
PCT Pub. Date: Feb. 11, 2016

(65) Prior Publication Data
US 2017/0180759 A1 Jun. 22, 2017

Related U.S. Application Data

(60) Provisional application No. 62/135,452, filed on Mar. 19, 2015.

(30) Foreign Application Priority Data

Aug. 8, 2014 (EP) .................................... 14180314

(51) Int. Cl.
H04N 19/98 (2014.01)
H04N 19/16 (2014.01)
H04N 19/186 (2014.01)
H04N 19/70 (2014.01)
H04N 19/30 (2014.01)

(52) U.S. Cl.
CPC ............. H04N 19/98 (2014.11); H04N 19/16 (2014.11); H04N 19/186 (2014.11); H04N 19/30 (2014.11); H04N 19/70 (2014.11)

(58) Field of Classification Search
CPC ...... H04N 19/98; H04N 19/16; H04N 19/186; H04N 19/70
See application file for complete search history.

(56) References Cited

U.S. PATENT DOCUMENTS 8,248,486 B1 8/2012 Ward et al.
9,288,489 B2 * 3/2016 Mertens ................. H04N 19/46
(Continued)

FOREIGN PATENT DOCUMENTS

WO 2005104035 A1 11/2005
WO 2011107905 A1 9/2011
(Continued)

Primary Examiner — Dave Czekaj
Assistant Examiner — Shanika M Brumfield

(57) ABSTRACT

To enable future video transmission of a large range of HDR videos, and render them on displays of variable dynamic range or peak brightness capability, we describe an encoder (301) for encoding an input high dynamic range video set of images (Im_5000), having pixel colors with luminances lower than a first maximum luminance (L_max_M), into an encoded high dynamic range video (Im_2000), being a high dynamic range image, i.e. with a maximum luminance for displaying on a display with a corresponding peak brightness of at least 900 nit, being characterized in that the encoding definition allows encoding pixel color luminances up to a second maximum luminance (L_max_C), which is equal to or less than 50% of the first maximum luminance, the encoder comprising: a re-grading unit (320) arranged to allow a content creator to specify at least a tone mapping function (F_2Tu, 601) for color mapping the encoded high dynamic range video (Im_2000) of lower second maximum luminance (L_max_C) to a HDR video reconstruction
(Continued)

(Im_5000*) of the high dynamic range video (Im_5000); and a formatter, arranged to write into a video signal (S_im) the encoded high dynamic range video (Im_2000) and as metadata the at least a tone mapping function (F_2Tu, 601), and related encoder and decoder embodiments and methods, and transmission technical components and technologies.

17 Claims, 10 Drawing Sheets

(56) References Cited

U.S. PATENT DOCUMENTS

| | | |
|---|---|---|
| 2011/0279506 A1 | 11/2011 | Rodriguez et al. |
| 2012/0230597 A1 | 9/2012 | Ward et al. |
| 2013/0170540 A1* | 7/2013 | Damkat ............... G09G 3/3426 375/240.01 |
| 2014/0002479 A1* | 1/2014 | Muijs ........................ G06T 5/50 345/589 |
| 2014/0079113 A1 | 3/2014 | Newton et al. |
| 2014/0210847 A1* | 7/2014 | Knibbeler .............. G09G 5/006 345/589 |
| 2015/0358617 A1* | 12/2015 | Sato ........................ H04N 19/44 382/166 |

FOREIGN PATENT DOCUMENTS

| | | |
|---|---|---|
| WO | 2012147022 A2 | 11/2012 |
| WO | 2012153224 A1 | 11/2012 |
| WO | 2014009844 A1 | 1/2014 |

* cited by examiner

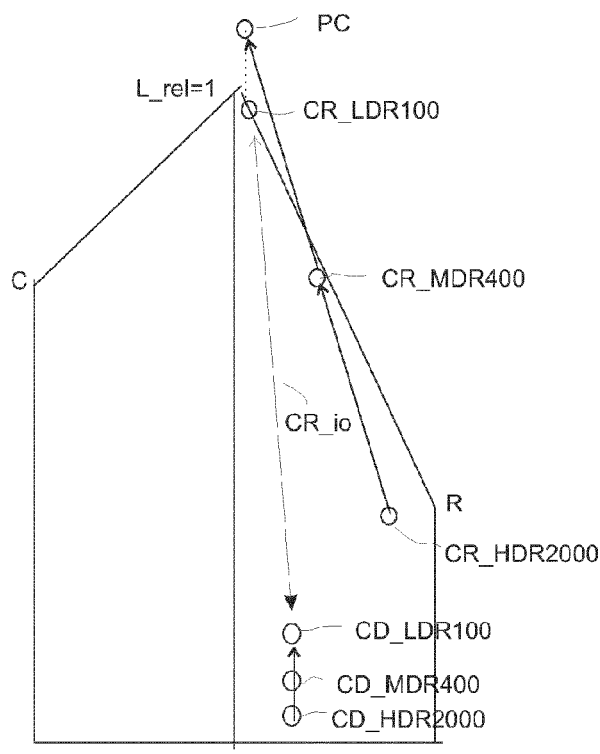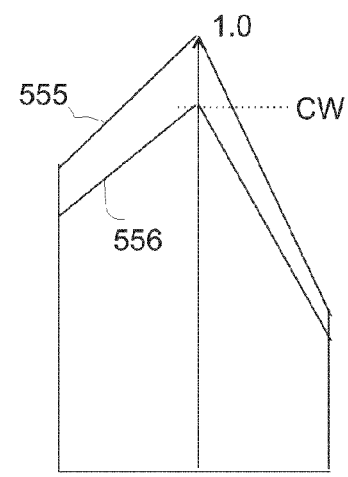
Fig. 5a
Fig. 5b
Fig. 5

METHODS AND APPARATUSES FOR ENCODING HDR IMAGES

CROSS-REFERENCE TO PRIOR APPLICATIONS

This application is the U.S. National Phase application under 35 U.S.C. § 371 of International Application No. PCT/EP2015/066653, filed on Jul. 21, 2015, which claims the benefit of U.S. Provisional Application 62/135,452, filed on Mar. 19, 2015 and European Patent Application No. 14180314.8, filed on Aug. 8, 2014. These applications are hereby incorporated by reference herein.

FIELD OF THE INVENTION

The invention relates to encoding of one (i.e. a still) but preferably more (i.e. video) High Dynamic Range image(s), and corresponding technical systems and methods to convey the necessary coded image information to a receiving side, and decoders to decode the coded images, and ultimately make them available for display.

BACKGROUND OF THE INVENTION

After many years of using classical image/video coding technology (starting with NTSC and continuing with MPEG 2 up to MPEG-HEVC), what we now call low dynamic range (LDR) coding, recently research and development has begun to determine the next generation of video codec, which is capable of handling so called High Dynamic Range (HDR) images of HDR scenes.

This would on the one hand require a camera which can capture the increased dynamic range, at least above 11 stops (e.g. the current cameras of ARRI getting about 14 stops), or preferably even above 16 stops. Some cameras use e.g. a slow and fast exposure and mix those, or other cameras can use beam splitting towards two or more sensors of different sensitivity.

Whereas in classical imaging a lot of information was thrown away (hard clipped), e.g. outside a room or car, present imaging systems can capture all that information, and the question is what to do with it then, in particular when rendering it on a display. 16 stops should already be sufficient to capture many (though not all) HDR scenes, but on a display one needn't necessarily render e.g. a welding arc as bright compared to an average brightness as in the real scene, nor could one do so on typical displays. Higher dynamic range displays are emerging currently, which have a higher peak brightness than the current typical 500 nit (or for grading reference monitors of 100 nit) peak brightness (PB) of LDR displays, like e.g. 800-1000 nit televisions are emerging, and SIM2 has made a 5000 nit monitor.

But LDR codec specifications cannot sufficiently encode the detail in HDR images to a receiver, especially when also needing to take into account the current typical limitations like inter alia word-length in number of bits of the code words representing e.g. the luminances (as codes called lumas), which have to be handled by various ICs (e.g. 10 bit per color component may be desirable, at least in some video communication applications). Especially if one wants a working system on short term, it should not deviate too much from existing technology in the field, yet still allow the encoding, handling, and final displaying of image, with much more beautiful HDR looks than an LDR image (e.g. brighter lamps or realistic fire, more contrasty scales of a lizard in the sun, etc.).

A HDR image is an image which encodes the textures of a HDR scene (which may typically contain simultaneously both very bright and dark regions, and maybe even intermediate brightness regions, with also a significant number of grey values which need to be accurately rendered ideally), with sufficient information for high quality encoding of the color textures of the various captured objects in the scene, so that a visually good quality rendering of the HDR scene can be done on a high quality HDR display with high peak brightness, like e.g. 5000 nit. FIG. 1 shows a typical HDR image, namely a toy store at night, with brightly colored toys or boxes strongly illuminated compared to the average illumination, because some of those toys are close to the local lamps, yet other toys are far away in shadow regions. In contrast with day scenes in which sun and sky illuminate each point the same similarly, at night there may be only a few light sources, which light the scene in a quadratically diminishing manner. This creates bright regions 104 around the light source itself, and dark regions in faraway corners. E.g. sewer inlet 114 gets almost no light from anywhere, so it is very dark in the sewer. I.e. in a night scene we may at the same time have image region luminances (or when captured by a linear camera: pixel luminances in those regions) of above 10,000 nit for the lamps themselves, and fractions of a nit, e.g. 0.001 nit for the dark regions, making the total dynamic range 10 million to 1. This being the theoretical range for the brightest versus darkest pixel, the useful dynamic range may of course be lower, since one may not need to accurately represent for the viewer a couple of small lamps or a small dark patch behind the sewer inlet, but in typical HDR scenes even the useful dynamic range of the normal objects of interest may be well above 10,000:1 (or 14 stops). Mapping these luminances blindly without smart re-determination of the to be rendered object pixel luminances to a display of 2000 nit peak brightness, means that it should "theoretically" (assuming that a relative-to-peak-white rendering is sufficient for good visual quality rendering of this exemplary scene) have a minimum (visible) black of at least 0.2 nit.

HDR video (or even still image) encoding has only recently been researched and has been a daunting task up to now, and the typical belief of the research community is that one either needs to go towards significantly more bits, for encoding the brightnesses above the LDR range of scene objects (e.g. encodings which encode scene luminances directly), or, one needs some two-layer approach, wherein e.g. in addition to an object reflectance image there is a illumination boost image, or similar decomposition strategies. An example of such a two-image-per-time-instant HDR video encoding system can be found in U.S. Pat. No. 8,248,486B1 or WO2005/1040035.

Applicant has recently proposed a much simpler single-image-per-time-instant approach (see WO2011/107905 and WO2012/153224), which is a parametric, functional manner of encoding both a HDR and LDR look image, because in addition to simply encoding a single HDR image (also called look or grading), typically suitable for displays with peak brightnesses (or in fact dynamic ranges) around a pre-chosen reference value, e.g. 1500 nit, we also want to cater in our framework for the other displays with other dynamic ranges in the market. I.e., since there will also be e.g. portable displays of 500 or 100 nit, rather than to leave it blindly to the receiving side how to change the encoded high dynamic range image to some reasonably looking LDR image by auto-conversion, we co-encode in color processing functions (and the parameters characterizing their functional shapes)

how to arrive at an appropriate LDR image starting from the encoded HDR image, namely an LDR image that a content creator could agree with.

With "high dynamic range" (HDR) we typically mean that either the image(s) as captured from the capturing side have 1) a high luminance contrast ratio compared to legacy LDR encoding (i.e. contrast ratios of 10.000:1 or more may be achievable by the coding, and all components of the image handling chain up to rendering); and 2) captured object luminances above at least 1000 nit should be encodable, or more specifically, may need to be reproducible above 1000 nit to, given the reproduction environment, to generate some desired appearance of say a lit lamp or sunny exterior. Or, the rendering of such image(s) is HDR (i.e. the images must be suitable in that they contain information which is sufficient for high quality HDR rendering, and preferably in a technically easy to use manner), meaning the image(s) are rendered or intended to be rendered on displays with peak brightness of at least 1000 nit (not implying they can't be rendered on LDR displays of e.g. 100 nit peak brightness, typically after suitable color mapping re-determining the luminances of the various image objects, so that the resultant object luminances are more suitable to the different display dynamic range and possibly viewing environment).

When designing a new HDR coding system, one has to research and come to a solution on a number of things consecutively, even before being able to fill in details of any practical coding system, for which there was no good uniform view. Firstly: what code allocation function which maps scene object luminances to e.g. 10 bit (or even 8 for lower quality systems, or e.g. 12 for professional quality) lumas actually encoding those to be rendered luminances for the pixels should one use? We will call the codes which encode the perceivable brightnesses or rendered luminances of pixels lumas, because this was the name given also in LDR encoding, but now the code allocation function may be one of possible alternative, but at least very different from the gamma 2.2 code allocation function of LDR video encoding. The skilled person will understand that when we elucidate a technology with a behavior of luminances or equivalently lumas, in actual embodiments the processing may be done on lumas themselves, like when using a Y'u'v' color representation in which Y' is a luma determined with a pre-fixed code allocation function and u' and v' are chromaticity coordinates, or equivalently on linear or non-linear RGB representations. The choosing of a code allocation function can be formulated equivalently as defining a master EOTF (electro-optical transfer function), which defines how a theoretical, reference display model which converts the luma codes or lumas of the HDR image into rendered luminances on the reference display. The LDR variant was fixed rather accidentally to a 2.2 power law or so-called gamma function, from the physical behavior of CRT electron guns, and it happened to work nicely psychovisually on those kinds of displays with peak brightnesses of around 100 nit, and with images captured according to a corresponding LDR capturing philosophy, with inter alia reasonably uniform illumination of the scene, correct exposure, and clipping of less interesting image regions.

But secondly, even before one can define a code allocation function distributing luminances to codes along a code range (e.g. 0-1013) one must define what one may call a master luminance range, which is a best range for encoding typical HDR. This step should not be overlooked. In LDR one just happened to have a range, by exposing relative to middle grey and white, and whatever dynamic range a sensor had (and ignoring that maybe e.g. a soft slope of celluloid film may yield a rather contrastless image, whilst a digital camera image may have clipping on the white end and/or drowning in the noise at the black end of the encoding). Early researchers working on still images thought it would make sense to just make that the linear range of typical luminances in the scene (i.e. from very small fractions of a nit, up to billions of nits), but for video coding given all practical aspects to take into account, it doesn't pragmatically make much sense to make this master luminance range go up to the 1 billion nits of the sun.

However, even when understanding that one needs to define a new master luminance range for handling all typical HDR images (typical after suitable artistic grading to object luminances which would be suitable for display, even high quality HDR display), the preconception was that one only needs to define one single large enough HDR master luminance range, which would then suffice for all scenarios. Those applications which desire an HDR look of a scene, would then work on a received image which was encoded along this master luminance range, e.g. with luminances up to a maximum luminance being 10000 or 5000 nit.

WO014/009844 describes an example of such a master luminance range-based HDR video encoding system, being similar to the below embodiments in that it also follows the single-image-per-time-instant encoding philosophy of applicant, whereby a sole image is encoded for each time instant of the video, which in this teaching will be a first, LDR (i.e. 100 nit) look, and in addition to that color processing functions are encoded in metadata associated with the sole images, to convert them into a second look, being a HDR look (which could be a 5000 nit master grading reconstruction). However, the teachings in this patent application follow the rationale of the single fixed master luminance range technical design philosophy. Typically only a single LDR and HDR look are encoded (from this information there might be other intermediate looks calculated at a receiving side, e.g. the LDR image may be upgraded to a look required for a 1200 nit connected display, but there is no other, intermediate, lower HDR-quality image encoding itself taught, i.e. only 100 nit LDR images are transmitted). And this HDR look is the master look created on the 5000 nit master luminance range, and the LDR image is an image for a 100 nit reference display, as happened in the LDR era, and the HDR image is actually encoded via functional transformation from the sole communicated LDR image. I.e. nothing but the master HDR e.g. 5000 nit image (HDR_ORIG, HDR_FIN) is taught in addition to the LDR look, which is typically required for backwards compatibility with legacy displays, etc.

US2014/097113 of applicant also teaches how one can communicate an HDR image, which may be the sole HDR image received, and wherefrom other gradings could be calculated, but this document is silent on that aspect. What this prior art teaches, is that one could encode several dynamic range looks alternatively in the same existing LDR encoding container technology. One has to indicate which version was used then, so that the receiver cannot be confused. E.g., the image pixels could have colors defined with 3 16 bit R, G and B color components according to a standard LDR encoding definition (i.e. with a Rec. 709 code allocation function). In that case the receiver will know this is a grading for a 100 nit display, and will hence display it with a maximum luminance exactly or approximately equal to 100 nit, even when the display has a peak brightness of 2500 nit, and could hence render images so bright. Alternatively, the same R, G and B color components could contain colors of a e.g. 5000 nit HDR image, which means that the relative values of object pixel colors will be different (e.g. a dark object may have a red component of 0.05 in LDR, but 0.0005 in HDR). In case the received LDR-container encoded images actually contain an HDR image, that fact will be indicated to the receiver, by metadata stating what the encoding actually is. Hence the receiver can know how to optimally render on a particular display, by its own optimization processing. E.g. if a 5000 nit image is received, and a 4500 nit display is connected, that image might be directly rendered without prior colorimetric transformation. If however a 100 nit display is connected, such a received 5000 nit image will first have to be down-graded, but that is not needed if already an appropriate 100 nit image was received. So what is taught in the prior art, is that a receiver may need to do on its side some color transformation to make e.g. a 1000 nit received HDR image more optimal for e.g. a 500 nit display, but in this teaching nothing is taught on how that should be done, let alone if and how that should be facilitated by communicating more information from a transmitting side. I.e., apart from teaching how to encode and specify various possible HDR or LDR gradings, this document however teaches nothing about system configurations actually having at least two HDR encodings at the transmitter side, nor the recoverability thereof at a receiving side (in this prior art there will be only one HDR image, which one could equate with our master 5000 nit grading).

It may when formulating a universal HDR encoding system seem rather illogical prima facie to deviate from the ultimate HDR image encoding on the single master luminance range (inter alia why would one need anything else than this best possible grading of the HDR scene, going up to what would be the highest reasonably renderable object luminances, or why would one make things complicated by having more possible ways to define HDR?), however the inventor felt there would for a class of applications still be a need for even more versatility regarding the definition of the luma codes and what HDR luminances, or more precisely to be rendered luminances on one or more displays, those lumas would correspond to.

SUMMARY OF THE INVENTION

The object of having a more versatile HDR video encoding technology which will be more future proof is realized by an encoder (301) for encoding an input high dynamic range video comprising a set of images (Im_5000), having pixel colors with luminances lower than or equal to a first maximum luminance (L_max_M), into an encoded high dynamic range video (Im_2000), characterized in that the luminance of any pixel in the encoded high dynamic range video (Im_2000) is less than or equal to a second maximum luminance (L_max_C) being at least 900 nit, and the first maximum luminance (L_max_M) being at least two times the second maximum luminance (L_max_C), the encoder comprising:
  a re-grading unit (320) arranged to allow a content creator to specify at least a tone mapping function (F_2Tu) for color mapping the encoded high dynamic range video (Im_2000) of lower second maximum luminance (L_max_C) to a high dynamic range video reconstruction (Im_5000*) of the high dynamic range video (Im_5000); and
  a formatter, arranged to write into a video signal (S_im) the encoded high dynamic range video (Im_2000), and as metadata the at least a tone mapping function (F_2Tu, 601).

Because this allows the grader to specify a very precise needed color mapping specification (F_2Tu) to map the e.g. 5000 nit master grading in the room available on the different 2000 nit reference range/gamut which is available for technical reasons. So there are—contrary to any prior art teaching or what prima facie reasoning would dictate—actually two HDR gradings. The one that the grader can make at will, and the one he needs to optimize for communication to at least one receiver. The luminances of the first, master grading run up to e.g. 5000 nit. The luminances of the pixels of the HDR encoding actually communicated, will potentially run up to a lower maximum (L_max_C), i.e. seemingly making this a lesser quality HDR grading. These maxima are associated with the graded images, and e.g. typically the encoded high dynamic range image pixel color data will be supplemented with a metadata indicator stating that this is a grading with luminances up to a possible maximum of 2000 nit (e.g. CODE_MAX=2000). Typically there will also be a practical to use code allocation function, which functional form might also be co-communicated to receivers in further metadata. The grader can so balance quality of encoding, which is inter alia relevant when a 5000 nit display needs an approximation Im_5000* of the master grading, but in addition to that a receiver also needs the look of the Im_2000 for rendering on displays of around 2000 nit peak brightness. Whatever the grader chooses, the invertibility constraints of the tool set of our re-grading unit will guarantee the reasonable reconstruction Im_5000*. I.e., what will be typically co-communicated as data specifying the exact mathematics of the upgrading color mapping functions from the received 2000 nit images to the 5000 nit images, will yield 5000 nit images which are sufficiently close to the 5000 nit images for a given application (i.e. typically the functions are so designed in factory for an application so that e.g. banding or noise is reasonable, in any case, for this invention this will be a set color transformation functions comprising at least one tone mapping function, which a grader can tune, i.e. typically he selects at least one of the functions to derive the Im_5000* and then with e.g. sliders specifies their parameter like e.g. a slope of a linear segment, and any receiver can once receiving the functions then simply calculate the required Im_5000*). Further embodiments may use under the hood technical calculations to further aid the grader in achieving the optimal balance of co-encoding the 2000 nit and 5000 nit grading/look in the same single encoded image, whether he is made aware of this and involved in this fine-tuning, or just focuses solely on making his best Im 2000 grading based solely on his artistic judgments.

Various embodiments of the encoder (301) may use pre-agreed values for the second maximum luminance (L_max_C), which are useful for an intended application (e.g. free video from internet may have less quality requirements). Values for L_max_C may typically lie between 900 nit and 3500 nit, preferably e.g. 1000 or 2000 nit. These are seen as suitable maximum luminances for pragmatic video encodings which re-use MPEG technologies like MPEG_HEVC/265, inter alia because of the match with an average envisaged peak brightness of displays most frequently deployed in the market in the near future.

Advantageous as an embodiment is an encoder (301) for encoding an input high dynamic range video in which the re-grading unit (320) is arranged to allow a specification of the mapping function (F_2Tu) comprising a color mapping specification which applies an arbitrary shaped monotonically increasing tone mapping, and a luminance-dependent saturation multiplication function, which functions are to be used in a color processing which applies the corresponding luminance and saturation change while keeping the same hue for the pixel color in the output images of the high dynamic range video reconstruction (Im_5000*) as in the input images of the encoded high dynamic range video (Im_2000). This can be seen to be the simplest yet versatile manner of color mapping compliant with the above technical system, and simple in terms of encoder or decoder IC construction. It makes sense to use a processing which keeps the hue constant, and then by optimally transforming the pixel luminances and saturations one can obtain a desired re-graded look for the new rendering situation, in particular the peak brightness of the connected display which is being supplied with optimally re-graded images (note that equivalently one may specify a luminance processing as a luma processing, but that is no detail which should be elaborated for the main concept of this invention and its embodiments). The skilled reader will understand that due to the semantic complexity of a scene and its HDR effects, a grader may want to design a complex mapping between the lower quality (2000 nit) HDR grading and the higher quality one (master 5000 nit grading), but typically those functional shapes would be monotonically increasing, as one does not want brightness inversions. Also advantageous is an encoder (301) for encoding an input high dynamic range video as claimed in one of the above claims, comprising a further grading unit (325) arranged to specify at least one further color mapping function (F_2T1, F_d2d) specifying how to color map the encoded high dynamic range video (Im_2000) into a third video optimized for rendering on a display with a peak luminance (PL_1, PL_2) which is different from the first maximum luminance (L_max_M) and the second maximum luminance (L_max_C). For each class of popular display out there in the market the grader can by this technical mechanism specify precisely the needed color processing to obtain the most appropriate look as rendered display output. Or, the grader can specify only a couple of grading, e.g. the 2000 nit one Im_2000, the 5000 nit one Im_5000* and a Im_100 nit one, and let the display figure out from this information which final processing to apply when going to a display peak brightness higher or lower than 2000 nit. It is useful if the grader can at least specify how one should re-grade to one further reference situation, and more specifically, one LDR grading, since transforming between various HDR gradings may both artistically and technically be very different from grading between HDR and LDR gradings. There grader may specify as many color mapping scenarios for various display peak brightnesses with their corresponding functions as he desires, but typically in view of effort and budget he may specify only a couple of key major transformations to extremities of the range of display peak brightnesses that the encoded video is supposed to cater for, and let the receiver do the final optimization of the required grading for a particular display (however the herein described encoding technology allows to specify at least the minimum amount of required color mapping function information).

Advantageous is an encoder embodiment has the further grading unit (325) arranged to specify the least one further color mapping function being a color mapping function for obtaining a 100 nit video from the encoded high dynamic range video (Im_2000). Since typically a user will still have some legacy devices (e.g. he may want to share the video to his mobile phone for some time while walking through the house and to his car) it is useful if decoders can also generate legacy HDR streams, which means that encoders should allow a grader to specify how such a LDR grading should look, in particular how it should relate to HDR looks, i.e. how it should be derived by color processing at least changing various object luminances from the 2000 nit received images. Also for tuning to other gradings for displays of other peak brightness, this color mapping to one reference display of considerably lower peak brightness (typically a legacy 100 nit LDR display), i.e. its functions and their parameters, will contain very useful information for a receiver to decide how to modify such functions to do its own optimized color mapping to any required display peak brightness grading, however any receiver desires to recalculate the mapping functions.

Also useful is an encoder (301) embodiment comprising a limit specification unit (389) arranged to allow a content creator to specify at least one limit of display peak brightness (LH_100, LL_100) identifying displays in a range of peak brightness for which the encoded high dynamic range video (Im_2000), or any video derived therefrom by applying a further color mapping (F_d2d), is of sufficient visual quality according to the content creator. This allows specifying for which range of displays the functional remapping definition is most suitable/optimal, and an example exact codification is given in the below description.

Advantageous is also a method of encoding an input high dynamic range video comprising a set of images (Im_5000), having pixel colors with luminances lower than or equal to a first maximum luminance (L_max_M), as an encoded high dynamic range video (Im_2000), characterized in that the luminance of any pixel in the encoded high dynamic range video (Im_2000) is less than or equal to a second maximum luminance (L_max_C) being at least 900 nit, and the first maximum luminance (L_max_M) being at least two times the second maximum luminance (L_max_C), the method comprising:

specifying a color mapping comprising at least a tone mapping function (F_2Tu) for color mapping the encoded high dynamic range video (Im_2000) of lower second maximum luminance (L_max_C) to a high dynamic range video reconstruction (Im_5000*) of the high dynamic range video (Im_5000);

writing into an video signal (S_im) the encoded high dynamic range video (Im_2000) pixel color data and as metadata the at least a tone mapping function (F_2Tu, 601). At the receiving side, mirroring our various encoder embodiments, there may be a video decoder (401) for decoding a high dynamic range video comprising a set of images (Im_5000) with pixels having luminances with values up to a first maximum luminance (L_max_M), the high dynamic range video being encoded as an encoded high dynamic range video (Im_2000), being characterized in that the luminance of any pixel in the encoded high dynamic range video (Im_2000) is less than or equal to a second maximum luminance (L_max_C) being at least 900 nit, and the first maximum luminance (L_max_M) being at least two times the second maximum luminance (L_max_C), the decoder comprising:

a video decompressor (403) arranged to read from a video signal (S_im) and compressed image data and decompress it to obtain the encoded high dynamic range video (Im_2000);

a metadata reading unit (477) arranged to extract at least one color mapping specification (F_2Tu) from the video signal (S_im); and a color processing unit (410) arranged to apply the color mapping specification to the encoded high dynamic range video (Im_2000) to obtain a reconstructed high dynamic range video (Im_5000*) with a third maximum luminance at least two times higher than the second maximum luminance (L_max_C).

So this video decoder can reconstruct approximately the original Im_5000 which was in the color grader's computer, even though it receives a very different graded image or set of images, of lesser luminance range (Im_2000). Various applications in the field may be more or less ambitious as to the ratio of the maximum luminance of the master grading, versus that of the encoding, but one may typically say the master grading should at least have a maximum which is twice that of the encoding (L_max_C), but it may also be e.g. 10× as much, or even more (typically the functions and/or their parameters mapping between the two HDR gradings may be somewhat different, but the same technical framework remains applicable). It will typically be at the transmission side selectable which L_max_C a grader will use, and he will then make sure he makes his master grading so that it can be faithfully encoded in the encoded high dynamic range video (or vice versa, after having made his master grading with a particular maximum, he may select from a set of codecs for communication to receivers which are capable of handling such master gradings with sufficient accuracy). One selected, the encoder will encode everything in metadata, so any receiver knows exactly which pixel colors it is getting, and in particular with which color mappings it should reconstruct the Im_5000* images from the received Im_2000 ones.

Advantageous is a video decoder (401) for decoding a high dynamic range video set of images in which the third maximum luminance is equal to the first maximum luminance (L_max_M). This is the exact luminance reconstruction, instead of e.g. a 6000 nit one. Of course decoders may also re-grade to other peak brightness gradings than the master grading, e.g. an intermediate 3000 nit grading. They can do that either by applying one set of color mapping functions exactly as received, or derive a final set of color mapping functions from at least some of all color mapping functions received (e.g. when re-grading between two HDR gradings, the receiver should check how the grader has specified that one should re-grade between two HDR gradings he selected).

Useful is also a video decoder (401) for decoding a high dynamic range video set of images which comprises a logic processor (405) arranged to determine which at least one display (452) having which peak brightness is connected and needs to be supplied with video, and to determine based on the peak brightness of that at least one display (452) which color processing (F_2Tu, F_d2d) is to be applied to the encoded high dynamic range video (Im_2000), to obtain an output image (Im_x00, Im_5000*) for transmission to the display.

This logic processor allows the receiver to optimize the driving images for catering for a very versatile range of possibly connected displays. It will read and determine the appropriate functions to apply, always starting from the object pixel color texture information defined in Im_2000.

Embodiments of the video decoder (401) may be connected to a wired video transmission connector (432) or a wireless video transmission connector (433), and have a transmission formatter (415) arranged to format at least the output image (Im_x00, Im_5000*) according to what is required for a video transmission protocol usable for video transmission via that wired video transmission connector (432) or wireless video transmission connector (433). So e.g. if a Wifi standard requires a HDR image communication in a specific manner, e.g. with yet another maximum luminance of the reference range/gamut, say 1500 nit, the formatter can re-encode according to that format. Important is that the original image information (Im_5000) and the artistic color vision the creator had, i.e. as encoded in Im_2000 and its processing methods, i.e. at least F_2Tu, is determinable at the receiving side, and can then be optimally converted to what is needed for a specific local rendering situation.

Embodiments of the video decoder (401) may be characterized in that the logic processor (405) is further arranged to read from the video signal (S_im) at least one limit of display peak brightness (LH_100, LL_100), and determine which color processing (F_2Tu, F_d2d) is to be applied based on the at least limit of display peak brightness (LH_100, LL_100). In this manner the decoder can quickly see whether the display to which it needs to supply images falls with a particular range which can be serviced by creating e.g. a re-graded image by applying e.g. a third set of color mapping functions co-supplied with the video signal S_im (note that the skilled person understands that any mechanism can equate with such co-supplying if the receiver has all information in time), or whether it needs to e.g. calculate its own optimal color mapping functions to derive the required re-graded images to be communicated to the display by calculating them from the received Im_2000 image(s).

Advantageous is also a method of video decoding of a high dynamic range video set of images with pixels having luminances decodable up to a first maximum luminance (L_max_M), the high dynamic range video being encoded as an encoded high dynamic range video (Im_2000), being characterized in that the luminance of any pixel in the encoded high dynamic range video (Im_2000) is less than or equal to a second maximum luminance (L_max_C) being at least 900 nit, and the first maximum luminance (L_max_M) being at least two times the second maximum luminance (L_max_C), the method comprising:

reading from a video signal (S_im) and decompressing the encoded high dynamic range video (Im_2000);
extracting at least one color mapping specification (F_2Tu) from the video signal (S_im); and
applying the color mapping specification to the encoded high dynamic range video (Im_2000) to obtain a reconstructed high dynamic range video (Im_5000*) with a third maximum luminance which is at least two times higher than the second maximum luminance (L_max_C).

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

FIG. 5 schematically shows a possible color remapping with our color mapping specifications (F_d2d), in this example for two displays of lower peak brightness than the maximum luminance of the encoded and received image (Im_2000), functioning as starting image, to which the color mapping is applied to arrive at the appropriately graded display driving images of the set of video images for the respective display (with 400 or 100 nit peak brightness PB), and shows an exemplary processing with a relative brightening of some selected colors from an image of a shot of a scene, e.g. a church interior or dark basement; therein FIG. 5a shows a typical mapping towards HDR for objects both critical in brightness and colorfulness, and FIG. 5b shows a possible way to handle outlier colors;

DETAILED DESCRIPTION OF THE DRAWINGS

Figure 1A:
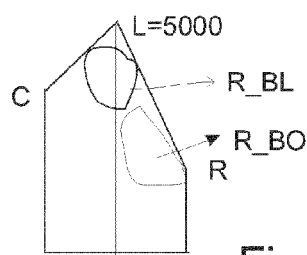
FIG. 1A schematically shows a high quality master encoding with a large luminance reference range.
Figure 1:
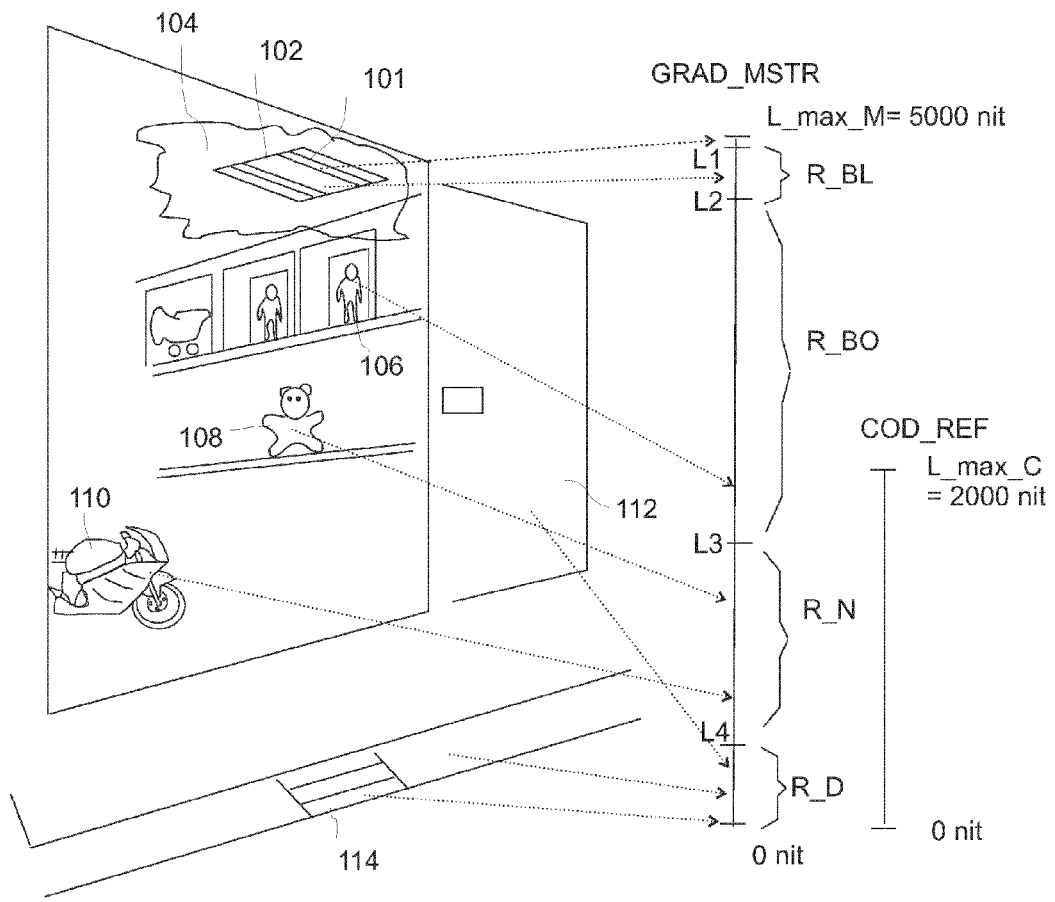
FIG. 1 schematically shows how a grader can convert any HDR scene into a high quality master encoding with a large luminance reference range, e.g. from 0 nit to 5000 nit.

FIG. 1 shows an example of a typical HDR imaging scenario with an internally lit toy store at night. It contains highly illuminated toys (compared to the nightly dark exterior), which of course as any reflecting object would have considerably lower pixel luminance than the lamps themselves, but they may still have relatively high luminances. And toys for children are usually very colorful too. And in contrast to a lamp 101, which could easily be rendered clipped without the viewer having quality objections (although some of the structure between the lamps, luminaire 102, and the region around the lamp 104 should ideally be faithfully encoded and when possible preferably rendered with various grey values), clipping the relevant information of the toy 106 would lead to lower quality rendered images. Before looking at the problem of code allocation, i.e. which luma values Y' should correspond to which camera-captured or to be rendered luminances Y (assuming they are directly rendered rather than further display-optimized), we need to first look at the problem of which luminances one would need to be captured in any such coding, which can technically be done by specifying a reference luminance range. This reference luminance range will have a sufficiently high encodable maximum luminance to realistically render all required object luminances, not just of this example image, but for all HDR images. Suppose the general illumination of the store is say 200 lux. The toys at the ceiling being 10× closer to the TL lamps would receive a 100× larger illumination, i.e. 20,000 lux. A luminance of white as a reflecting object color therefore would be around 0.8*20,000/pi=5000 nit. This would bring the luminances of such relatively brightly lit objects close to the luminances of lamps if the maximum is 5000 nit, or at least the colors of bright objects may fall in the upper region of a gamut of possible colors defined by e.g. a 5000 nit reference luminance range, or even a 2000 nit reference luminance range (COD_REF). Note that of course on the one hand colors for an optimal rendering need not be graded with exactly the values in a real scene (because this will be just a rendering, which by its nature is somewhat approximative, even if an average brightness of any particular viewing environment of the rendering were to be exactly the same as the average brightness of the imaged scene), and on the other hand, as we will show below, there can be mathematical techniques to encode a luminance with another luminance, or more precisely, a luma code which was supposed to encode another luminance. However, the calculation gives a quick view on the technical constraints which are desirable for HDR encoding systems. Highly saturated colors would e.g. for a red toy yield a luminance of about 30% of this, but they would then also reside (however mapped, whether hard clipped or soft clipped) in an uppermost luminance region of the smaller gamut in its red corner. This gives properties of a desired HDR (native or derived) encoding of a scene, but specifies nothing yet about any lower dynamic range look image for the same scene, which by the very nature of its technical limitations, specifically the peak brightness of the intended medium dynamic range (MDR) rendering display, may be very different A first question in any HDR image encoding chain is how to map real scene luminances to the luminances of our reference luminance range GRAD_MSTR, which for simplicity we assume will typically be the one the content creator likes to work with, i.e. do his final color grading yielding the desired artistic look in. Ideally, a high quality display capable of rendering at least necessary to be faithfully rendered luminances (because the grader would like to check his high quality master grading on a high quality reference display, because whatever final display his content will be shown on to various viewers, ideally some renderings will happen on very high peak brightness HDR displays, and the content still needs to look spectacular), i.e. having a peak brightness of at least 5000 nit, should render the reference range of luminances, and for simplicity of explanation we can assume that if the actual viewing environment is the same as the defined reference viewing environment we can assume that this reference display just renders the reference luminances from GRAD_MSTR one-to-one I.e. if a specified luminance is e.g. 3200 nit, the reference display will render 3200 nit.

After having fixed a sensible reference luminance range GRAD_MSTR, it is then still to be decided how one maps the scene references to the reference range, once having chosen a suitable reference range GRAD_MSTR. If already one would desire all details in a very bright 20,000 nit TL tube to be accurately represented/coded, for sure for practical video encodings one doesn't need to have an accurate encoding of the 1 billion nit of the sun's surface. This first step will largely be a scene-dependent artistic optimization, in which such high luminances would be "misrepresented" i.e. they would be represented as reasonable substitutes on the GRAD_MSTR. E.g. the master grader may choose which extremely bright objects to clip in his master HDR grading, and e.g. grade and thereby for any later step represent the sun with white or a single high brightness yellow, e.g. maximum yellow (R=G=100%, B=0%). Taking all relevant factors in HDR image and in particular video coding in mind, typical reference ranges GRAD_MSTR may be e.g. 20000 nit or 10000 nit, or 5000 nit, and in the remaining elucidation of our embodiments we will assume GRAD_MSTR to cover the luminances [0,5000], which is technically a good pragmatic choice. Note that the value zero may actually be a very small luminance, which value may vary depending on the standardized code allocation function to be used, but will for practical purposes be so low it may be equated to zero.

A second question is how to map captured scene luminances. This problem is not necessarily the same as how to render luminances on any display, since there may still be any rendering color transformation acting on the reference luminances (and actually the colors, but for simplicity of explanation we will in general assume that the hue and saturation of a color stay the same throughout the imaging pipeline, with only the luminance of the color changing) to obtain the most appropriate rendering for a particular display and typically also some viewing environment. But those are linked somewhat, feeding properties of displays into the reference range itself, if one associates the reference range with some typical near and mid future display. Since the coming years, and maybe forever, displays will typically not have peak brightnesses of far above 20000 nit, or maybe not even above 2000 nit, it makes more sense to encode any scene luminance from a display-renderable point of view rather than an accurate scene encoding point of view. I.e. one can "misrepresent" scene luminances. What helps with that are two factors: 1) The fact and insight that one can derive different representations from any encoding, as long as enough discriminatable information for the pixel textures is coded (i.e. worst case one can e.g. capture the texture of a red kilt, and re-color it in software pixel by pixel into a green kilt, and the same can be done for grey-values or luminances, but then none of the pattern-determining different luminance or color values should be grouped together into a single value), and 2) human vision is adaptable, and especially the brain can correct with imagination for malformed colors, especially if the viewer wasn't present at the scene and didn't know the actual colors. A task of any HDR technology, in particular an encoding system, is that it can make believable images, rather than photometrically correct ones.

So in general the grader can map a HDR scene like our toy store, or a sunlit landscape seen from a darker room interior, relatively faithfully according to his preferences on a sufficiently large reference range GRAD_MSTR up to 5000 nit. Whereas that initial master grading has its own technical and artistic rules, it shouldn't be confused what happens in the technical components further down the image handling pipeline. In particular, it isn't trivial how to map such an environment to a smaller range, like e.g. COD_REF with a maximum of 2000 nit, although for various reasons there can be various technologies in the pipeline which use such a smaller range as their HDR reference range (typically from that point onwards, or at least in a part of the pipeline).

The present application will elucidate some embodiments for going to such intermediate representations with smaller reference range COD_REF while starting from a larger, better reference range GRAD_MSTR, and typically a best quality image graded on that reference range.

FIG. 1 elaborates with an example how a grader may typically want to represent (allocate) his scene luminances to the various available sub-ranges of GRAD_MSTR. The TL tubes or other lamps 101 themselves the grader may want to map to the maximum value L_max_M, or at least very close to it, e.g. above L1=4995. The luminaire 102 itself, being typically of reflective metals, does contain some interesting patterns, which one may at least want to suggest with some discriminating values, to render it more realistically than just a "white hole" (which uniform detail-missing white region would be a typical LDR rendering), i.e. one wants to code it in a range R_BL of very bright lights. These may probably be very desaturated near neutral if not already achromatic, so those pixel colors can fit in the typical narrow tent top of an RGB codable gamut. Below that range R_BL of very bright lights will be a range of bright objects R_BO, like our toy 106 which is very close to the lamp. Since these pixels (in our example the toys but also e.g. the painted walls of houses or grass in the sun outside) of bright objects may often be (strongly) colored, even where we may at least desaturate their coded values somewhat compared to the original scene colors, we need to allocate a range of the RGB gamut tent which can represent bright chromatic colors. There being a relative relationship with the actual scene, it may be sufficient to have them reasonably bright and reasonably colored. We see in FIG. 1A a three-dimensional (more precisely a two-dimensional Red-Cyan-Luminance cut therefrom) subset selection in the codable gamut rather than a less illustrative 1D luminance view (n.b. in practical implementations of our methods one may also use luminance correlates like e.g. a Value=max(R,G,B) to determine the selections, or do any color processing). As one sees, the bright lamps may, unless they are really chromatic e.g. red TL tubes, often be represented by very bright values of reduced saturation, and the viewer will accept that. However, one should not do such pastellization with e.g. sunlit grass, because that is exactly the kind of error happing in LDR coding. If colorful colors are needed, they can be graded in the bright reasonably chromatic subrange R_BO. Even if we coded a color with half the original saturation, for a display which can render higher saturation (e.g. a multiprimary display having a dedicated primary there), one could always double the saturation without having too excessive image artefacts.

Once having defined a good HDR reference display of e.g. 5000 nit, one still needs to define the problem of how to encode the scene colors, or more specifically their luminances.

Classical LDR imaging didn't have too much consideration for that aspect. Whatever the scene illuminance was, the auto-exposure of the camera just associated some bright color in the imaged scene with code white (actually via some average color calculation mapping to mid grey). If one ponders upon this now with hindsight from HDR research, this is a very particular look on a scene, which always works mathematically, but technically or artistically is mostly suitable for well-lit environments with not too much contrast ratio, e.g. typically 1%-100% reflecting objects being uniformly lit, and recording down to whatever dark object colors are accidentally still faithfully represented in the sensor or coding mathematics over noise (a usual number given for what rendered luminances any LDR image should correspond with is 0.1 nit to 100 nit pixel luminances). Some, or even many, colors may have been clipped, and the whitest faithfully coded white may have been 20,000 nit in a sunny scene, or 50 nit in a long exposed night scene. And also on the rendering side in the LDR image handling philosophy one didn't care whether a grading theoretically optimal for 100 nit was actually being seen by a particular viewer on a 200 nit, or 400 nit, or 50 nit display, nor whether it was seen in a darkened room or on the platform of a train station. For most images, and the usual non-critical viewer, such a difference of maybe one or two stops would not be that critical, but at a certain moment for highly critical HDR images and/or displays which differ by a number of stops in peak brightness from 100 nit, differences are bound to become objectionable. It should be clear that the similarity of the ultimately rendered look and the intended look of the creating artist is only guaranteed if the viewing conditions don't differ too much from a theoretical reference one, if ever that was even clearly defined in the LDR coding times.

But in a future-oriented HDR image or video encoding technology, where the image, whatever the complexity of its contents, has to be correctly interpretable for reasonable rendering on a large variety of different rendering conditions out there in the field (display+environment), the reference range and color gamut, but also how to use/fill it with scene colors being captured and represented, should be given sufficient thought.

Preferably, one wouldn't do the allocation fully relative like in LDR (i.e. whatever scene is in the LDR image, the white of the code is always mapped to the white of the display, whatever peak brightness that display has, and if one e.g. needs to render a dark scene, one better uses codes which encode luminances below peak brightness). There will be some relativeness in the final rendering also for HDR encoding systems, since the eye/brain is a relative color detector and the rendering conditions could vary considerably, but that variability can be handled at a receiving end, but starting from a more mathematically exact specification of the colors in between, in some color representation (which then is also not per se linked anymore to one particular display technology, like NTSC and MPEG2 were linked to a CRT with gamma 2.2 and EBU primaries, which once was the only display in the market).

On the other hand requiring an exact one-to-one mapping of the scene luminances to the reference luminances in the e.g. 5000 nit reference range on the one hand, and the reference luminances to the display rendered luminances on the other hand, is also to restrictive a constraint for pragmatic easy and versatile use.

So one would like to typically have the reference range GRAD_MSTR so constructed and filled (i.e. allocation of the scene luminances to reference luminances), that a large part of the luminances are approximately one-to-one mapped by which we mean that a particular scene luminance will ultimately correspond to a to be rendered luminance on all types of receiving display (whereby it is not necessary that the rendered luminance is identical to the scene luminance for a category of scene—e.g. bright sunlight, or nightscape-since there may be some dimming factor between the physically observable luminances in the scene and those on a display, which dimming factor could even be display-dependent to some extent, and can be initially determined for a typical display category). This approximate identicalness of the darker rendered pixel luminances on various displays would typically be true for the lower luminances in the scene, which can be rendered on many (though maybe not all) displays. However, since at the high end luminances could in theory be anything (potentially up to the luminances corresponding to e.g. image laser beams shining on the sensor), at the bright end of the possible scene luminances we may use a more liberal allocation of scene luminances to reference luminances, since e.g. 50,000 nit would—if already ever renderable on a sufficient amount of displays in the market—be too bright to be comfortable for the viewer (especially in dark viewing environments), hence needs to be converted to a more suitable to be rendered luminance value anyway (whatever the peak brightness of the rendering display may be). According to applicant, 5000 nit would be a reasonable value for the upper limit of the reference range, although 10000 nit would also be a well-usable value.

The somewhat darker, less strongly illuminated toys/objects 108 can then be allocated to some luminance in a normal range R_N, which may also be reasonably faithfully rendered on LDR displays, and the further away objects 110 are from the lamp, i.e. the darker their pixel luminances linearly measurable from the scene become, the lower they are also allocated to the reference range (assuming that we are in the linear allocation strategy here, with on GRAD_MASTR L_ref=k*L_scene, with k equal to 1 or some upon the situation optimally chosen (by the color grader) scaling factor which will typically not be too low, e.g. 0.5, to keep all pixel colors, and the darker ones in particular, sufficiently bright). Outside the toy shop, in the street at night lit with few lamps, there will be very dark objects, which will be mapped to the dark subrange R_D of the reference range. Although one may typically use some non-linear code allocation there to brighten them up somewhat, if there are sufficient codes (e.g. 10 bit) for the luminances, one may continue the linear allocation with k having its chosen value. These values, e.g. of the dark hardly lit door 112, are then at least coded with non-clipped sufficiently unique codes, irrespective of whether those dark colors will (can) be rendered on a low contrast LDR display with bad, i.e. relatively bright, black. The same will apply to the dark gutter pixels, although the ones of the sewer 114 seen through the sewer grid may be so dark and uninteresting that the grader can just map them all to code (minimum) black being the smallest codable value, e.g. luma 1 or 0, and hence its corresponding luminance (if they were already sufficiently clear and non-noisy captured by the camera in the first place).

This mapping to a 5000 nit range may be reasonably straightforward to do, and we can assume e.g. the grader will do it, however, directly mapping those values to a smaller [0, 2000] nit range might pose problems to the grader at least for some critical scenes, i.e. those problems should not all be solved purely by the grader's artistic skills of choosing appropriate reference luminances for the different scene objects, but the grader should have a technical solution to help him. E.g., if the lights and light parts of the shop are dimmed to map them in the 1500-2000 subrange of COD_REF, what happens to the darker parts then with this dimming? In case the dimming uses a simple non-linear code (re)allocation, have those darker colors then become too dark, at least for simple direct use, by renderers, which e.g. display the codes with a fixed EOTF? There is a tension between inter alia aspects such as how many codes to reserve for each object texture which can possibly exist (or in the actual scene does exist) along the luminance range on the one hand, and the reasonable look of the image, i.e. a reasonable luminance value for each object, at least on one reference luminance range corresponding to one archetypical rendering scenario (which would need only secondary order color transformations of lesser impact on the colorimetric look for tuning to particular rendering scenarios on particular displays thereafter). Several trade-offs could ad hoc be contemplated, but a guiding framework is desirable, to do things well, always.

Figure 2:
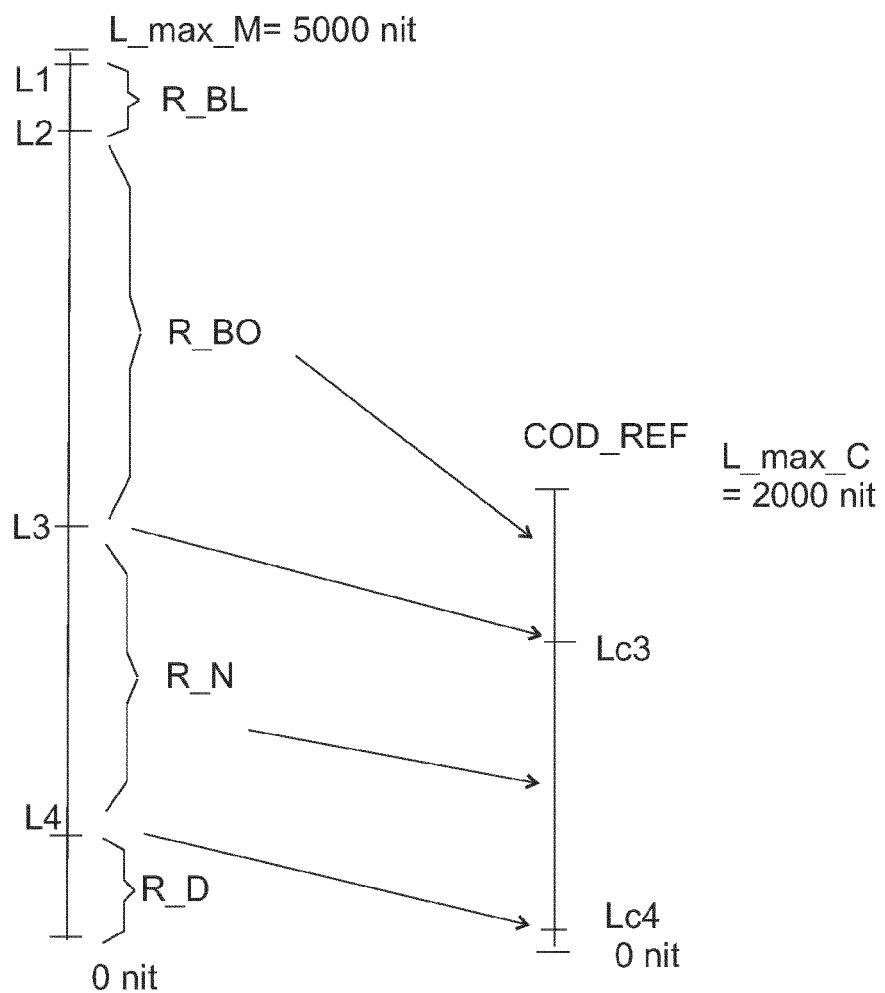
FIG. 2 schematically shows how this master grading specified on reference luminance range GRAD_MSTR can then be redefined into a HDR encoding to be communicated to a receiving side with a substantially smaller maximum luminance (yet still capturing all or most of the HDR aspects of the imaged scene), which code maximum luminance M_COD_REF is typically equal to or less than 80% of the original range (5000), e.g. 2000 nit, or oftentimes at least 2× as small.

In FIG. 2 we see an illustration of how to handle the general problem of re-coding pixel luminances (and associated therewith lumas, which will be the word we will use for the actual codes as e.g. 10 bit words) along a master reference luminance range GRAD_MSTR into a substantially smaller (typically at least ½, also describable as being 1 stop less) coding reference luminance range COD_REF, e.g. the grader master grading in [0, 5000] nit and the technical coding, actually used e.g. for storing on a memory like e.g. a blu-ray, or transmitting over a networking technology by means of a video transmission coding technology, having a [0, 2000] nit standardized reference luminance range.

The reallocation problem is a technically very different problem from the initial master grading of scene luminances into a reasonably graded image defined on the master luminance range [0, 5000], although there is of course some linking with the original reference representation (in GRAD_MSTR), and ultimately the original scene and its contained objects with their colorimetric properties, or also, its sufficiently faithful display rendering.

This contains two aspects: on the one hand, if one considers both ranges to have an infinite coding precision (and one could then for simplicity describe the luminances along both ranges as real numbers within a renormalized [0,1] range of normalized luminances, whereby of course the luminances renormalized from their definition in [0, 5000] will not have the same values as the corresponding luminances for the same objects as they were defined in [0, 2000]), one could in principle, and according to the present teachings, use any non-linear mapping function to map the luminances, with of course given the situation, some mappings being more desirable than others. E.g., although probably not optimal for various reasons, conceptually in principle a linear stretch could be used. On the other hand, in this re-allocation of the luminances, one can now handle the problem of coding precision, which needs to happen if one has to represent the luminances of COD_REF with actual e.g. 10 bit lumas. Because this amount of bits available for defining a pixel luma will, depending on how which particular chosen code allocation function allocates subranges and their amount of codes to various objects along the luminance range, always determine the precision of coding of objects (e.g. the ones being no brighter than 10% of peak luminance), and in particular whether there are sufficient codes for faithful rendering (e.g. a blue smoothly changing grading between 20% and 30% of peak brightness, versus a complex textured part of the toy shop in the background, which may not need ultimate coding and luminance/color reconstruction precision).

Actually, 10 bit lumas can encode (ignoring the chromatic components for now) only 1024 different luminances (/grey values), so if one has a very high dynamic range scene for which one needs ultimate precision everywhere (in the bright colors subrange, the upper-mid-greys, the lower-mid-greys, the darks, and the ultra-darks), one may need more than 1024 different values to faithfully encode all image structures. This is what makes HDR image encoding different from the simple LDR imaging paradigm. In that situation one could say that there is not any possible solution being able to faithfully encode the scene, neither in the 5000 nor the 2000 nit range. However, in all practical images one can relax the amount of codes needed for a sufficient quality encoding. Perhaps fewer codes are needed in a spatially textured region, allowing for more codes for a smooth gradient, and if worst comes to worst one might even consider to occasionally allow some banding, yet still being able to render all the beautiful HDR effects, at least on HDR displays (by having a master range and a grading thereon, the grader can at least have a good initial view on the quality of various later, receiving-side rendering scenarios).

Now the reader should pause a minute to reflect on a new concept particular to HDR coding, namely that there are two competing mutually coupled things happening, especially if one wants to use the 2000 nit re-mapping both as a picture to substantially directly render (i.e., there may be some further remapping to obtain an optimal look for an ultimate display, say a 2800 nit display, or a 1500 nit display, but starting from the look graded in the 2000 nit coding, that original look is still somehow engrained in there, this being a two-step approach: image and look creation, versus ultimately image rendering, and all the further considerations and actions that may happen in that part of the HDR image handling chain), and at the same time also as an ultimate (i.e. device-independent, and use independent, for any future use) full encoding of everything interesting which was in the original HDR scene, i.e. a sufficiently faithful representation of the colorimetric properties of all objects of the original scene, or at least a sufficient, HDR quality representation of that scene. The former consideration is something the artistic grader is typically involved with, yet the latter requirement may be partly or largely a technical issue.

E.g., let's take as a simple example linear compression from 5000 to 2000 nit, and direct one-to-one rendering of the 2000 nit range on e.g. a 2000 nit peak brightness actual display (monitor or TV, or projector, etc.), or e.g. the 0-2000 nit subrange of a 5000 nit display (which would be different from (re)stretching the 0-2000 nit re-defined scene luminances to the full range of a 5000 nit peak brightness display).

There may be—given we can optimize for the available display hardware better taking the psychophysics of human vision into account—due to this inappropriate "accidentally chosen" mapping some HDR rendering quality issues. E.g., the bright region HDR effects may be suboptimal: because one doesn't have the actual 5000 nit graded image available, one may want to do some color processing tricks to still make the bright regions look more HDR-ish psychovisually, even on a 2000 nit display. But what if one has a 5000 nit display available? Is simply stretching (automatically in image processing software or hardware) these luminances, which one would do in absence of any smarter guidance regarding the mapping, the best thing to do then to most optimally render them on the 5000 nit display? Most likely not, at least for more critical HDR scenes.

On the other hand, the grader may find some of the objects in the lower subranges of the directly rendered 2000 nit range to dark, or too low contrast etc. If he tries to adjust for that, e.g. by brightening that subrange, he may even further deteriorate the bright HDR range, e.g. by soft-compressing it in his re-grading/re-mapping.

On the other hand, once one has fixedly defined an optimal code allocation function or EOTF for the 2000 nit range, e.g. in a particular video standard defined for a scenario (which definition may typically start from assumptions that certain luminances steps are still visible or not, non-uniformly distributed over the 2000 nit range, yielding as optimal function some logarithmic-gamma-like function or similar), one must also mind the problem of how many luma codes are available for each subrange, e.g. a $10^{th}$ part of the range between Lc3 and L_max_C. If somehow too few codes are available, then the HDR scene is not optimally represented, because the subrange for scenes with important very bright content, which may be beautifully rendered on e.g. 10000 nit displays, may not be sufficiently encoded in a 2000 nit coding. That may not be such a visible issue when one-to-one rendering the 2000 nit grading on a 2000 nit display, but emerge e.g. when mapping to a 20,000 nit display.

So mechanisms are needed for carefully handling this balance, and the basic concepts we introduced in our technologies for encoding HDR scene images, and in particular for being able to correctly service not one single reference display (e.g. 5000 nit) but all displays out there in the future in the market (via a tunable redeterminable look on the scene encoding) is very well suited to this problem as we will see below. To be sure the reader gets the point, we can use two new naming. On the one hand there may be a final grading, which may be determined typically automatically by an optimization unit in a receiver, which tunes whatever coded representation it receives to the particular display. We will call this grading to be rendered, on e.g. a 1250 nit display, between two standard gradings on extremities on a range of display tuning of say a 100 nit grading for legacy LDR displays with a peak brightness around 100 nit and high end HDR displays of say 5000 nit, a medium dynamic range (MDR) grading. In the below teachings, we are also talking about intermediate encodings, i.e. which have a reference display associated with them of say 1000 nit (which is also between the range extremities of 100 and 5000), which we will call intermediate dynamic range (IDR). It should be understood by the reader that, if a certain technology for some reason prescribes to encode whatever dynamic range image of a scene (i.e. whatever the original scene is, and however it is to be rendered) in an IDR encoding with a reference display peak brightness of say 1000 nit, that this may still be rendered, i.e. may still need to be tuned by further color conversion to various MDR gradings, e.g. for an actual connected 850 nit display, or alternatively or additionally a 1550 nit display, etc.

Figure 3:
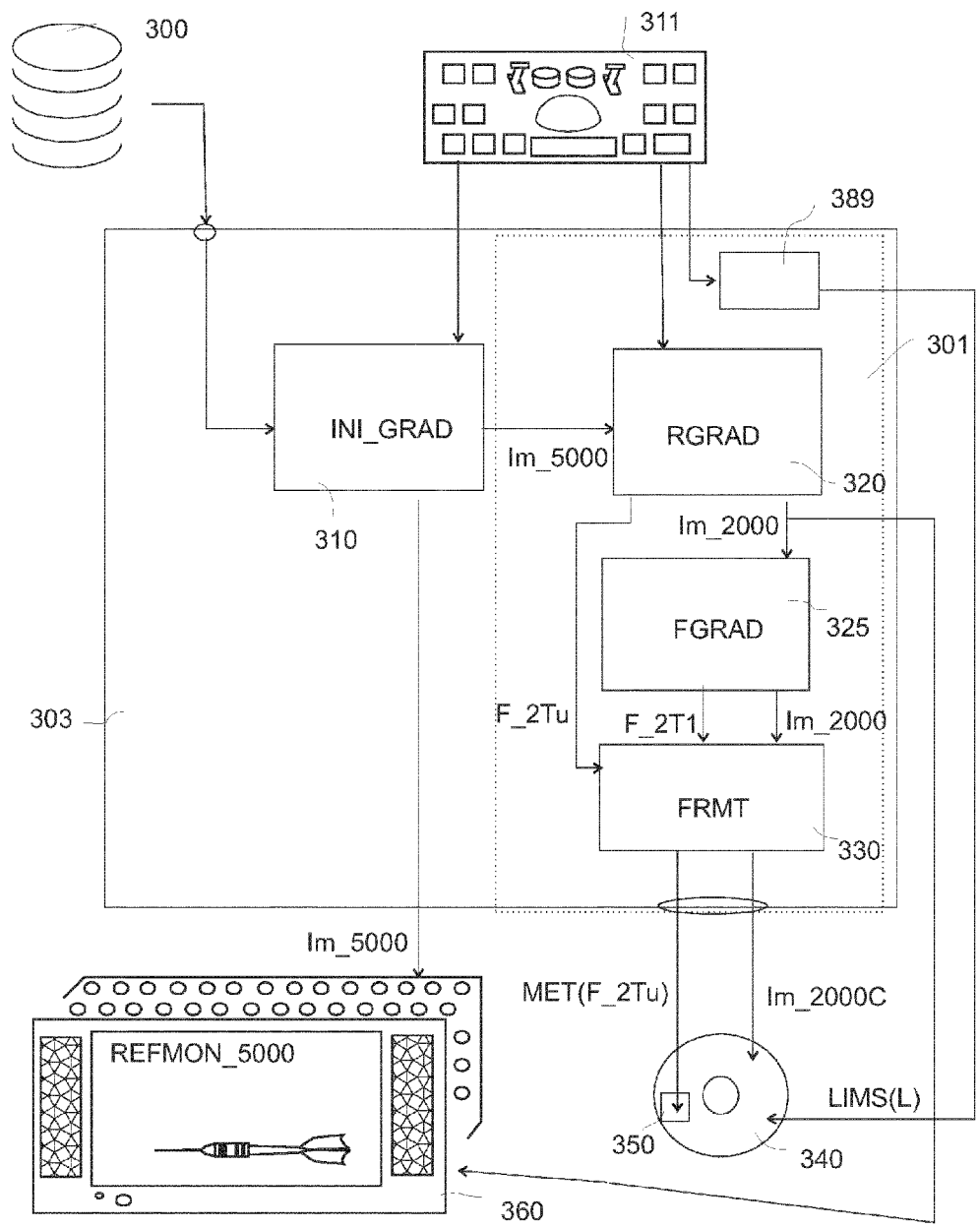
FIG. 3 schematically shows a possible creation side encoding technology with an encoder embodiment according to the below novel teachings allowing a grader to specify what he needs, in particular e.g. a 2000 nit grading, and the 5000 nit grading technically co-encoded with it in a parametric functional manner, with color processing functions to reconstruct the 5000 nit grading from the communicated 2000 nit grading.

A first embodiment is elucidated with FIG. 3, which shows an encoder 301, by which a grader may liberally make a 2000 nit artistic grading without having to mind too much about what goes on, and has to go on technically because the encoder may need to use the 2000 nit image as a representative image for all looks. I.e. the grader can focus on the look of the 2000 nit images, so that when directly applied to displays of peak brightness around 2000 nit, the images will look optimal (e.g. enough brightness so that a man hiding in the dark will neither be plainly visible nor invisible, enough local contrast so that a man half hiding in the mist will look ghostly, or a bottle will look shiny, etc.). We assume there is original RAW HDR video (e.g. straight from an HDR camera, and say in a linear color representation), which e.g. comes from a storage memory 300, which goes in a grading apparatus 303. The skilled reader can of course understand that there can be different actual realizations of our invention or embodiments, which e.g. have an encoder integrated directly with or in a camera, or in a computer graphics suit of a computer, etc.

The grader makes an initial grading which will in many embodiments be the master grading by using initial grading unit 310 and a user input controller 311, which may e.g. be a grading console. Initial grading unit 310 may e.g. be a processor running grading software like Da Vinci's, which can do e.g. global tone and color mapping functions, select travelling matte local regions in shots of images and specify processing therefore, etc. As an example we may assume that the RAW video is logarithmic video with the wrong inter- and intra-object contrasts from say an ARRI camera. The grader makes his master grading image(s) Im_5000, in which he specifies all object and pixel colors with inter alia their appropriate luminances on a corresponding 5000 nit GRAD_MSTR reference range. That would be a nice representation of the HDR video—which could then be video compressed by inter alia DCT encoding etc.—if only any video transmission standard would define a way to encode this 5000 nit referred video according to its standard (with transmission standard we mean inter alia both transmission via memory carriers like e.g. an optical standard like video on BD, and e.g. a networked standard, like airways broadcasting by DVB, or internet-based delivery, or transmission over an inter-apparatus communication system like HDMI cable communication, etc.).

But a standard may want more freedom and prescribe that it accepts e.g. only 2000 nit peak-luminance defined coded video. The grader can then not use directly his 5000 nit reference internal encoding, and needs to re-encode, which may involve non-trivial remapping (because in principle one could use any re-definition, but not necessarily if the colorimetric look of the 2000 nit grading has to be optimal when rendering on a 2000 nit display, as well as the 5000 nit look also encoded within this 2000 nit look). A possible scenario could be that the grader focuses most of his time on creating the desirable look of a 2000 nit grading, and as secondary task focuses on how a 5000 nit grading can be made from this. The other way around is also possible (basically technically in both scenarios there will be a lower dynamic range HDR image communicated, and functions to re-grade this by a receiver to a higher dynamic range HDR image), and in the below elucidation we will explain this second scenario where a grader focuses most of his time making a desirable 5000 nit HDR grading, and then secondary (which could also be done partially automatically, with him only having to accept or correct, to save on costly grading time) he will define a good 2000 nit look (and typically also a 100 nit LDR look, which could be defined from the 5000 nit look and converted into a re-definition from the 2000 nit look, but we elucidate the example where the LDR look is not only defined but also created by grading, starting from the 2000 nit graded image(s)).

The grader will do the remapping of a high range HDR image (e.g. 5000 nit) to a low range HDR image (e.g. 2000 or 1200 nit) with re-grading unit 320. This unit 320 can do color grading just like initial grading unit 310, but there are two fundamental differences: 1) Only a limited set of re-grading functions can be used (because this being a HDR look coding system, they should form a language understandable by all receivers) and 2) They should be substantially visually reversible (more generally, the color transformations to the 2000 nit image should substantially retain all the high quality, higher range HDR information, so that it can be used optimally on whatever HDR rendering system, after some optimal display-dependent mapping, and only image—semantically less interesting information may be significantly substituted by inappropriate values from encoding point of view, e.g. coarse quantized). With substantially reversible we mean that a) we can calculate some mathematical inverse of the applied function or remapping procedure from 5000 nit HDR to 2000 nit HDR (e.g. if we apply a square root over e.g. luminances normalized in [0,1], the inverse will be a square power function), and b) because of quantization of the square rooted image the re-squared image may look a little different from the original image, but we should not have too severe differences visually (which amount of severity the grader and/or an automatic image analysis algorithm can decide). E.g., in textures, you may get away with some quantization artefacts, since the spatial pattern is the predominant information in the brain rather than a very exact color value of a pixel. Mathematically this typically means that the functions color mapping a received 2000 nit HDR grading to the ultimate quality e.g. 5000 nit grading image(s) should be monotonously increasing over luminance (or some equivalent representation like a luma, or the maximal one of the linear R, G, and B components, etc.), but otherwise the upgrading tone mapping function may be quite complex for some complex HDR scenes.

For increased clarity for the reader we now make a clear distinction with two other scenarios one should not confuse the here presented novel HDR image/video coding technology with. Although an artistic grading is made which represents nice looking images for displays with peak brightnesses around the optimal intended one having e.g. 2000, or e.g. 1000, nit peak brightness, and although the ultimate look for the viewer of this obtained Im_2000 nit grading may be substantially identical to the one the grader would obtain if he needn't take any other displays or gradings therefore into account (i.e. just artistically makes a sole 2000 nit grading, and need not be bothered whether any further grading could be derived from this images(s)), our described technologies need to deal with the situation in which there is NOT merely a simple (re)grading which just yields a new Im_2000 image from the Im_5000 image, but rather need to take further requirements into account. Because the original (needed for the higher quality HDR renderings) Im_5000 image which is optimal for getting good HDR looks on displays which have a substantially brighter peak brightness than 2000 nit (i.e. with a corresponding display having around 5000 nit peak brightness, which may be the reference display 360 the grader had available at the content creation side for checking the actual HDR visual impact of what he was doing, and which he can switch between 5000 nit max. and 2000 nit max. emulation mode) is not actually going to be stored or transmitted, but rather since the standard prescribes coding a 2000 nit image, the encoder stores or transmits only a 2000 nit image of the HDR scene. This Im_2000 needs to contain sufficiently precise information for all object textures, no matter in what look on the scene they will ultimately be rendered (i.e. color transformed).

In addition to this Im_2000, the encoder is however going to co-store some functions F_2Tu which parametrically co-encode this additional information in the Im_5000 image which encodes the 5000 nit look (this information being mostly which ultimate, average colors the objects should have rather than their precise geometric textures), i.e. e.g. how sunlit outdoors landscapes or lamps (or other high brightness HDR look effects) can optimally evolve through the luminance axis or full-range color space for different looks corresponding to different display peak brightnesses, i.e. be rendered if we had brighter displays, compared to if we had only less bright displays like at best a 2000 nit display or even a 1000 nit display. This at least one set of additional functions F_2Tu will not only allow re-grading (which we will call display tuning) to the 5000 nit look itself, but also to other looks intermediate between e.g. 2000 and 5000 nit, i.e. for displays to be serviced with optimally looking images which such peak brightnesses. So we are talking about a new way to encode a set of looks, not merely a technology to re-grade a number of looks on a transmitter side only.

Our present technology should also be clearly discriminated from and not be confused with yet another scenario, where a 5000 nit display is served directly for its rendering by a 2000 nit image Im_2000. The 2000 nit image is some HDR image, with a considerable inter-object contrast, so e.g. this image could be directly rendered on e.g. a 5000 nit display, using it in a so-called relative coding and rendering framework, i.e. by rendering a supposed-to-be 2000 nit white as a 5000 nit white (whether that visually looks more spectacular, or less desirable because it is e.g. too bright for the given scene, of e.g. a misty landscape). One could even envisage tricks to mimic such ultimately desired 5000 nit looks, if they were the only image(s) needed at a consuming side, which pretend they are 2000 nit looks, but with the wrong colorimetry (i.e. the color codes would be incorrect, which would show if one wanted to directly render those mimicry-images on a 2000 nit display). Or, some smart auto-conversion function could analyze the image, maybe understand it is too misty for optimal higher quality HDR rendering, and apply a display optimization mapping function F_2000_do, which on a [0,1] input and output luminance graph will look like a function which ends the output for input 1 on e.g. 0.75, i.e. making it less than maximally bright. In this scenario the display at the receiving end has only the Im_2000 image, however that was obtained, i.e. graded, for whatever chosen artistic reasons, but, no information whatsoever on what the original Im_5000 image was. So the receiver has to make all kinds of blind assumptions in deriving its "optimal" driving images for say a 5000 or 6000 nit display at the receiving end. This doesn't seem optimal, especially for complex HDR scenes. It is not unlikely that, although this technological imaging chain does optimally satisfy the proportion of users having 2000 nit displays out there in the market, the users who spent more money on higher quality 5000 nit HDR displays are not getting the best quality for their money, and certainly not automatically always what the original grader intended (his optimized Im_5000 image). So we need an additional technology which can be communicated via some technical means, which is satisfactory for the entire potentially to be serviced market, i.e. whichever system a particular user has. This would work for e.g. scenarios in which a viewer buys some particular information via some HDRx-type version of a BD disk which he reads with some apparatus which has a BD reader, and gets some further color mapping metadata information on that disk, or alternatively e.g. via internet, and the user wants to display the video at the same time on two different displays like e.g. his high end 6000 nit TV at his summer house, or an expensive hotel where he is staying, and a 500 nit mobile phone 451 which his son is using at home.

Not only does the encoding system have to be able to cater for various possible higher actual display peak brightnesses than the one of the reference display associated with the actual transmitted images, but also for lower ones, e.g. 200 nit. So typically on the content creation side there will be a further grading unit 325, which although not the core of our present invention, we will shortly describe. In our coding paradigm, although it may also work with single (only HDR look) encodings, we preferably want the grader to be able to say something about the LDR look (i.e. how HDR should be downgraded to be optimal for displays with lesser luminance dynamic range capabilities. Thereto the grader can specify at least one function F_2T1 (or typically a set of functions working both on the luminance and chromatic color components of the pixels, e.g. a color saturation change, globally and/or partially locally) which can be used to map the Im_2000 look which is coded in the image communication technology, to e.g. a 100 nit reference LDR.

The reader should understand that the 2000 nit HDR is still a HDR image, so transforming between 2000 and 5000 nit, and 2000 and 100 nit (an LDR look on the scene), may technically as well as artistically be very different. And furthermore, it is relevant whether the peak luminance of the reference range of the actually transmitted image(s) is e.g. 1000, or 2000, or maybe 4000. The former is (only) 10× brighter (i.e. approximately 3 stops) than 100 nit LDR, whereas the latter is already an impressive 40× brighter (which is a major factor especially for images to be viewed in a dim or even dark viewing environment). Depending on the type of HDR scene to be encoded, compared to LDR we may for the 3 additional stops allocate some extra-bright image regions over those additionally available stops. For 40× (5 stops, i.e. another 2 additional stops) one may create some spectacular HDR effects, like e.g. ultra-bright laser swords, or explosions, etc. Of course in 2000 nits the laser swords may also be rendered, but then less spectacularly bright.

We will for the various elucidating examples assume that the color mappings occur in a relative luminance gamut: because images are typically quantized to e.g. 0-1023 when having 10 bit color component representations, with the maximum code 1023 corresponding to some reference maximum luminance for a particular codec, we can specify both the e.g. input Im_2000 image and the output Im_100 for 100 nit reference LDR displays on a relative gamut or graph, having its physically codeable/realizable normalized peak luminance at Lmax=1.0 corresponding with 1023, and so can we therein specify any color mappings.

Figure 9:
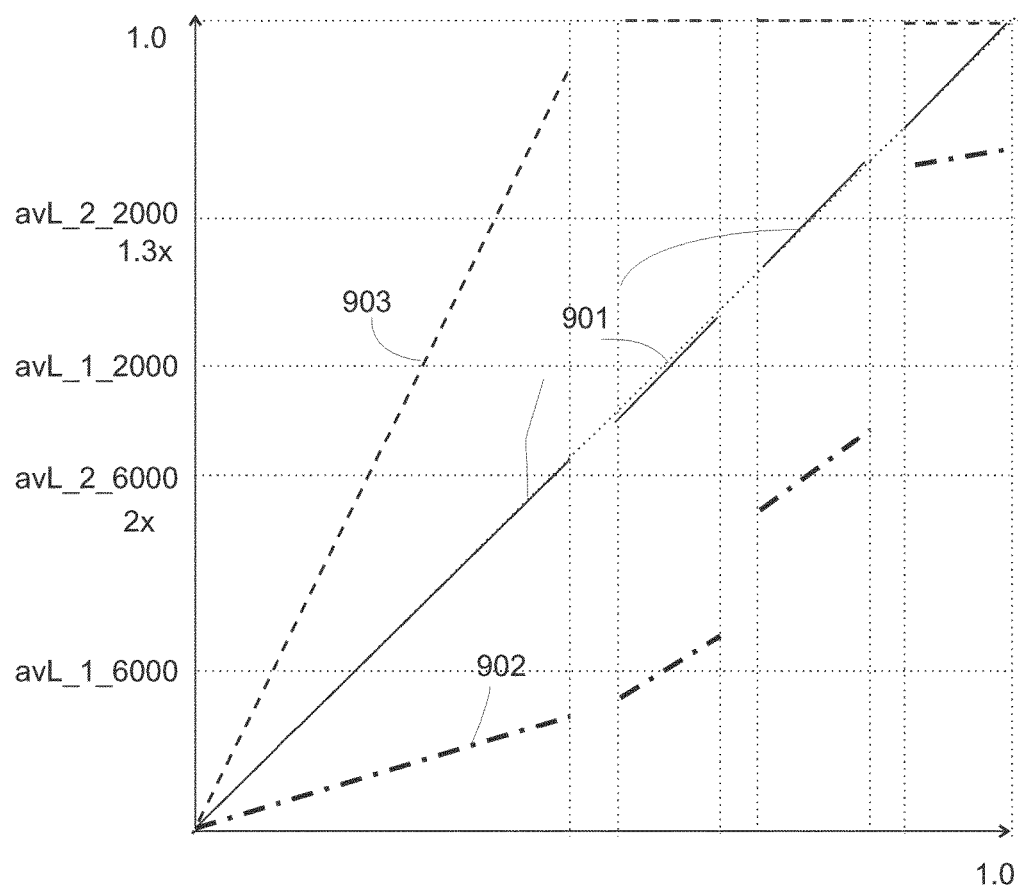
FIG. 9 schematically shows how both a higher peak brightness HDR grading and an LDR grading can be derived from a received 2000 nit grading, and how those two can be of a technically fundamentally different nature.

FIG. 9 shows an elucidating example of how the upwards grading (and the information thereof as transmitted in F_2Tu) may considerably differ from the downwards gradings, i.e. to peak brightnesses below 2000 (encoded in at least one or a set of a set of function(s) F_2T1, to re-grade e.g. from 2000 to 100 nit, but further sets of functions to re-grade e.g. to 800 nit may additionally be communicated to a receiver too, or their may be mechanisms to re-grade based on only one set of color transformations specifying in general how downgrading should happen). Note that there may be difficult or easy HDR scenes, but a system should of course be able to handle all of them in a reasonable manner. A big contrast with classical video coding (which deals mostly with technical issues, like that an image must be split in DCT blocks, which apart from some block artefacts can always be done no matter what the imaged scene actually is, with maybe moving water being the worst scene) is that in this HDR look spectrum encoding philosophy, the various looks need also look realistically, or as artistically desired, and that is a complex function of both the kind of scene/image, and the non-linear behavior of human vision adapted to a particular rendering environment. So one can ask the question: what kind of object renderings may be as HDR effects in the 10× LDR range (i.e. up to 1000 nit), and the 15× range (so also the part between 1000 and 1500 nit), etc. This is partly a relative question, because the visual brain can highly adapt to situations, and the interpretations of the images seen. Also in old paintings of e.g. van Schendel, although there is physically certainly no high dynamic range between the canvas or paint white and the black paint, the painter can use tricks to emulate higher dynamic range effects, with the brain estimating e.g. bright lights. So e.g., if one merely takes a street on a sunny day, where part of the street is in the shadows, some people may be critical about how dark relatively to the sunlit part the shadows should or should not be, whereas other people may accept several possible renderings. As to how bright exactly the sunny part should be, there may be more disagreement, or otherwise put, a larger variance in optimal renderings. And of course a 1000 nit peak brightness monitor may not "correctly" render the sunlit street if it is supposed to be optimally rendered in a viewer's living room at 2000 nit, but an approximately 1000 nit rendering is the best what a 1000 nit display can make of the image, and this may not be totally bad (it is just a somewhat lesser impact image, in which the viewer must fill in more of the sunny experience himself in his brain (i.e. from lightness perceptions), rather than really experiencing it totally (from also the correct brightness appearances)). FIG. 9 elucidates with a nice example how the gradings for various points along the peak brightness range of intended displays can vary, i.e. as regards their dominant grading guiding principles. We assume we have an image which is more graphic than naturalistic of nature, with a couple of whites, which may appear as e.g. a car's headlights, street lights, and the lights through windows of buildings etc. Note that in HDR as in real life, and in contrast to LDR, there may be several whites. LDR has just its white, and maybe a little room for highlights, but in the real world, and in any coding having enough luminance range left above the diffusive white of the main area of interest, there may be e.g. a white which is strongly illuminated by the sun from outside, or the white surface of a TL tube etc., which can all have considerably different average luminance. In a graphic rendering, think e.g. of the movie Sin City 2, one may even have objects which are artistically (unnaturally) made white. E.g., there is a person with white glasses. In LDR one may render those without any problem with the peak brightness of 100 nit or say 500 nit, but if one renders them with peak brightness white on e.g. a 5000 nit display, he person may seem to have lighthouse beams coming out of his eyes, which may be far from the original intention. So one may want to render these whites in HDR with a considerably lower luminance than e.g. the car headlights, yet in LDR there is color gamut room for only one and the same white.

Suppose we look at FIG. 9 from a receiving side now. The graph 902 may on the transmitter side have been a 6000 nit master grading—whether straight from a camera, with maybe the camera operator tuning the look quickly with some tuning buttons changing some brightness and contrast values or highly artistically graded offline—but now it will be a grading which can be derived from the communicated grading 901. A real world example of several HDR whites (or bright regions) is e.g. the sun shining on a carpet indoors through the window, and the brighter sky outside, and the even brighter sun shining on e.g. a metal roof outside.

So a receiver will get images defined on a normalized luminance axis, which corresponds to a peak brightness of 2000 nit. The graph (which we show here as an identity transform or diagonal line in case a 2000 nit input on the x-axis has to be re-graded to itself as output) consists of 4 parts. The darkest part going up to about 45% (i.e. to be rendered luminances up to 900 nit, which may e.g. emulate a sunny outdoors as rendered in a dimmer viewing environment) for the normal scene, i.e. e.g. the reflective objects in a room, or street, etc. Above this range there are three bright ranges, which for simplicity we will assume are white ranges (i.e. there may be some different luminances in their because of object structure, but assume there is no color). The lowest of the three may e.g. be the artistic ultrawhite spectacles of the person. The middle one may be a cozy lit room interior seen from outside, and the highest one e.g. a street light, or the headlight beams of a car, etc.

The reader can see that the re-grading, i.e. what is done by the tone mapping encoded in F_2Tu towards higher peak brightnesses than the communicated Im_2000 mostly relates to a redistribution of the lights. We assumed that the (bottom part) object colors are to be rendered the same, irrespective of whether the viewer has a 2000 nit or 6000 nit, or even 10000 nit display. I.e., on a relative (linear) axis, the bottom part of curve 902 will be $\frac{1}{3}^{rd}$ of curve 901. The bright regions however in the 5000 nit grading (902) are however put in there realistic absolute positions, i.e. how all high quality renderings of the imaged scene should look. The grader finds that on average the second bright region should ideally be twice as bright as the first, to give a good additional brightness impression (avL_2_6000=2* avL_1_6000). In the 2000 nit grading however, that cannot be simply realized. Not only will some of the second bright region then have to clip, but more importantly there will absolutely be no more room on the 2000 nit reference luminance axis to encode the third bright region. I.e., by technical necessity they must be put closer together. However, the grader may choose to do that in a way so that there is still some reasonable difference between avL_2_2000 and avL_1_2000, i.e. still some reasonable impression of this being different kinds of light. And furthermore, if the receiver has received the correct functions, he can re-calculate the required relative luminances for a 5000 nit grading based on the pixel luminances of the 2000 nit received image. Of course, especially how things will artistically look to a viewer optimally, will be a highly scene-dependent problem, so to have a good HDR handling and encoding technology, one needs a system which can sufficiently handle all these particularities. Note that for the downwards grading, this is far from a mere reversal of the arrow of the color processing functions. In this example the grader has firstly chosen not to boost the lower part of curve 901 with a factor 20, but rather to spread those luminances out over most of the available relative luminance range of the 100 nit grading (curve 903), and secondly, he decides to make the three bright regions all peak brightness white. So in contrast with the upwards re-grading—to and fro—this is definitely not necessarily a reversible operation in this example.

Figure 10:
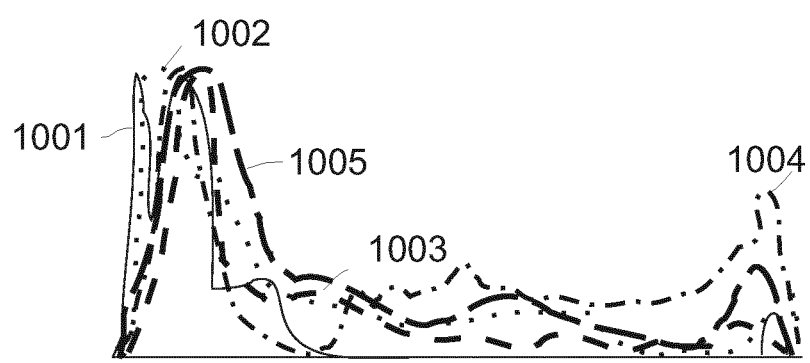
FIG. 10 schematically shows a couple of typical luma histograms of HDR images.

FIG. 5a elucidates some more details of possible mapping to LDR, in which one needs to represent a HDR range image of a church with a stained glass window. The interior of the church is visually (i.e. its appearance) normally light, but relatively to white of course rather dark. That is because space is needed in the gamut for bright stained glass window colors. I.e., the inter-object contrast CR_io between pixels of the church interior (CD_HDR2000, or CD_LDR100) versus the stained glass pixels (CR_HDR2000, or CR_LDR100) needs to be large (i.e. a significant percentage of the luminance extent of the codec gamut, so that upon rendering, the objects are also sufficiently different in average luminance), even in a LDR grading (in that LDR grading the contrast would of course be at most as large as physically realizable and still reasonable, which means often clipping may be involved as the grader's preferred solution, or at least color desaturation). In this gamut representation from which we again made a red-cyan cross section to show both chromatic action and brightening along the luminance axis, we show the result of mapping functions to map between (as starting (best encoded) image) the HDR Im_2000, secondly an intermediate representation MDR e.g. for a 400 nit peak brightness display, and the typical reference LDR with peak brightness of 100 nit (we needn't emphasize all details here about which general multi-segment tone mapping functions, and saturation control functions, and local region selection functions etc. can be used, as the skilled person can imagine them generically, and the invention is rather about the grading framework, and associated therewith the coding framework for allowing all this grading information to correctly reach a receiving side, and then ultimately the corresponding correct rendering). Going towards darker peak brightness displays often typically involves brightening in the relative gamut. So this will typically also be how—apart from the encoding signals typically having metadata explaining what they are, like which peak brightness of a reference display the image is for and which code allocation function was used when generating the luma codes (and if there are functions for converting to other peak brightnesses, the value of those peak brightnesses),—one can see the difference between HDR and LDR images: LDR images will often have a more uniformly spread histogram (sometimes simplistically called monomodal or "Gaussian") due to the uniform lighting of the scene objects, and HDR may have considerable content in the relative dark subrange (a strong lobe), as well as content in bright subranges, like e.g. a strongly lit area, and oftentimes a gap of sparsely allocated luminances in between. In FIG. 10 we see a couple of example luma histograms of HDR scenes, with 1001 being a bunker with a view to outside, 1002 a building seen from the sunlit outside with darker parts inside, 1003 a stained glass window in a church, 1004 a building and shrubs against a sunset, and 1005 the relatively darker inside of a building and the outside world seen through relatively large windows. E.g. the sky will typically be a couple of stops brighter than the rest of the scene, and of course lamps, at least the lamp itself, will be typically much brighter than the rest of the scene. If one directly renders an image with so many pixels in a dark lobe (i.e. renders an HDR image on an LDR display, which HDR image is not suited for LDR display), one typically gets an image which looks too dark, because a large region or percentage of the pixels looks difficult to discern blackish. I.e., whatever the precise color conversion a grader may desire for each scene, LDR re-grading may oftentimes involve at least a brightening of the darker pixels, e.g. through a multiplicative contrast stretch of that luminance histogram sub-lobe. It is also useful for the reader to note what dynamic range in general means. Experts in the past would have answered that in a very simple manner, namely the dynamic range would be the luminance of the brightest rendered color versus that of the darkest one. That may well be a reasonable measure for rendering, but it says little about coding. As mentioned above, an image may be encoded as say 0.01 nit to 2000 nit (reference display peak brightness), i.e. appear to be an encoding of a 200,000:1 dynamic range scene. However, if one can upgrade to a 5000 nit representation, it would appear that one has in the same image an encoding of a 500,000:1 dynamic range. From an encoding perspective the dynamic range, and more importantly the brightness-complexity of an image, is rather determined by how many (and which, i.e. what their typical renderable average luminances should be) different grey-value (or differently lit typically) sub-regions there are, and with which intra-object texture/geometric object property complexity of coding quality those are encoded. E.g. a man or monster partially hidden in the mist is psychovisually or artistically not just an issue of where its average luminance will be placed on the renderable luminance axis, but also, which precise intra-object contrast is needed, to make that monster correctly spooky. This brightness distribution property shows why relative rendering (i.e. compression onto the gamut between display peak brightness and perceivable black of an LDR display), is often not a good manner to handle HDR rendering (this way of rendering ignores the correct dynamic range or luminance distribution aspects of this particular image and scene, and hence makes a very incorrect dynamic range rendering). Or framework of technological components will be able to handle all those aspects, i.e. not only the high quality rendering of all necessary pixel brightnesses (luminances) on say a 5000 nit display, but also faithful approximations when needing to render on displays of lesser capability, i.e. lesser peak brightness. That will involve a complicated trade-off on which higher quality aspects of the image of the scene, in particular which HDR effects (e.g. the brightness appearance of a lamp versus the contrast of the man coming out of the mist), will need to be sacrificed to a particular degree given the lesser display peak brightness, which may in some cases be partially done by smart image analysis software, but will often be optimized artistically by a human color grader.

Returning to the LDR re-grading of the church of FIG. 5a, if one wants—to the extent possible—the colors of the dark corners of the church interior (CD) to look the same (i.e. be rendered with the same display output luminances) on the various displays, if the 2000 nit display is for all colors (when equally driven relatively, i.e. e.g. for peak white) 20× brighter than the 100 nit display, for the same output rendering one would have to boost the driving luminance (or in fact of course the corresponding lumas R', G', B') for the LDR display (or its color CD_LDR100) 20 times. Of course, even when necessary for being able to see enough of the church interior, this can only happen whenever possible given the gamut limitations of the LDR display. If e.g. CD_HDR2000 would have a luminance of 0.05, such an LDR conversion would not be realistic, because we would end up at a luminance of 1.0 for LDR i.e. white, but typically of course in the HDR coding which can go down to very dark luminances, the relative luminance may e.g. be $1/10000^{th}$ of peak white or less. Still, of course when mapping CD_HDR2000 to CD_LDR100, the grader need not use exact output luminance equality as his criterion, but he may use whatever mapping he finds visually pleasing. Note that these mappings to lower dynamic range looks need not be reversible, since one only needs to derive the LDR image from Im_2000, and need not re-grade up again. For simplicity the mapping of MDR may be some interpolation of the mapping to LDR, e.g. the mid-point on a psychovisual equidistant scale, but of course it could be anything, and the grader might even want to specify another dedicated function to map from Im_2000 to MDR. The red colors in the stained glass window in the scene to be represented may be highly saturated, yet still very bright. This would happen in the Im_2000 HDR image if one encodes those pixel colors near the maximum luminance or driving value (255 or 1023 e.g.) of the red primary R. Going downward, e.g. to MDR, the grader will stumble onto the physical limitations of the system, and may want to balance colorfulness to still get as much as possible a brightness impression for the windows, i.e. maintain a sufficient inter-object contrast, which the brain then interprets as nicely bright colorful windows. This will typically involve a mapping to CD_MDR400, which keeps the color in the gamut tent top at sufficient saturation, i.e. still sufficient distance from the achromatic luminance axis, i.e. still sufficiently low in the converging top part of the gamut, and as close as possible to the gamut boundary (i.e. without posterization, due to neighboring colors in the texture becoming equal). For LDR the grader chooses to continue the mapping (e.g. since 2000 to 400 is about two stops, and so is 400 to 100, the grader may consider doing the mapping in the same direction, and over an equal distance, but in general it may be any mapping balancing lightness and saturation taking into account the psychovisual aspects of both displays, i.e. from which peak brightness for the higher peak brightness displays particular light effects start occurring in visual appearance, versus the grader having to cram together excessively some HDR effects on lower peak brightness displays, like a 100 nit one). In this example we see the grader's choice of just clipping to (near) white of the CR_LDR100, leaving just a little of the picture texture on the stained glass window shining through ethereally in the LDR look. As how to technically encode these downmapping functions F_2T1, there may be various ways. E.g. the grader may use a technology which specifies the functions on disk so that they stay within their (valid) limited range [0,1], i.e. the mapping to MDR is co-encoded as metadata to the Im_2000, and the LDR look is then at the receiving side mathematically extrapolated therefrom. Or one may technically allow color mappings to pseudocolors PC defined in an extended gamut which goes beyond the typical [0,1] gamut range. In that case one can accurately specify the LDR color PC for obtaining the appropriate MDR color CD_MDR400 by interpolation, and the actual renderable LDR color CR_LDR100 will be determined at the receiver end by the decoder applying a clipping mechanism (which could be fixed or also specified, e.g. by encoding a selection number from a number of selectable clipping strategies). FIG. 5b shows one of the embodiments of how outliers can be encoded for LDR graded image specification. One maps to the full gamut 555 between 0.0 and 1.0, but some of the codes are reserved for unrenderable colors in LDR (but renderable when tuned to MDR colors). The actual gamut of LDR renderable colors is 556 (i.e. how the colors should be rendered on an LDR display, possibly involving desired clipping), which may be specified by defining a maximum or white point CW, e.g. at 0.85. Out of gamut 556 colors will be clipped to that gamut prior to rendering the LDR image, by some fixed or communicated clipping strategy. Some content creators may find the extrapolation of an LDR look from a MDR coding on disk a safer embodiment, because there are not less colors for the LDR object regions. Still, it amounts to a similar strategy, since one will define relatively the CW by actually enclosing the larger gamut 555 snugly around the most out-of-LDR gamut color definition needed for the current image(s). I.e. one defines the texture data with an image which has maximal occupancy, i.e. no clipping in the lowest encoded image. So this corresponds then to putting some MDR image on disk, and applying a further mapping to yield the final LDR to render, which happens to have some clipping component.

In summary one can generically say that typically the mappings between HDR representations involve the re-positioning of the brighter objects along the relative luminance axis (e.g. to make them extra bright, balancing display capabilities with the meaning of the object actually in the image, and psychovisually playing on the brightness appearance in addition to the lightness appearance), whereas the mapping to LDR images involve the puzzling of all object gray value ranges together in some optimal way given the small gamut of renderable colors which is available, which are two technically different tasks.

Behind this is a philosophy of the usefulness to encode not just one single HDR image, but actually a spectrum of looks for various rendering situations with various display peak brightness, which is not a trivial thing, because for each look image one constantly needs an optimization act given all factors like technical limitations like word length of the agreed color code (in fact complexity of calculation ICs, or bit budget available for communication, and oftentimes incorporatability in legacy technologies like e.g. a satellite video broadcasting system, etc.), but of course also artistic considerations, but in fact all of these desiderata are optimized together (so one needs a good technical framework, so that e.g. the human color grader cannot make something which is artistically fantastic, but doesn't map with the available technology, so in the end looks disappointing).

E.g., consider having a scene which is dynamic-range-wise complex, with e.g. an interior room with averagely lit but also pretty dark regions, but through some openings a view on a sunny outside world with also several regions of critical color and/or brightness, which may be already a complex scene to optimize on a 5000 nit reference luminance range or color gamut. Still then the viewer will correctly see various regions which are somewhat darker in the inside part of the room, with precisely the correct average brightness so that visibility is correct, but also the mood of the scene, etc., but also various bright regions which emulate a real-world outside region. The question is now however how to keep giving all these differently lit regions distributed in a balanced manner, for all the lesser dynamic range views on the scene (i.e. with lesser maximum luminance, and for rendering on displays of lesser peak brightness). A 2000 nit rendering may still have a significantly high quality HDR look, but still one has to decide how to re-distribute luminances which were between say 3000 and 5000 nit, to luminances of somewhat below 2000 nit. E.g., the grader may consider that to be done optimally, be keeping all the luminances inside equal to those of the 5000 nit grading, and keep the outside sufficiently bright and sunny, i.e. keep its average luminance close to the maximum of 2000 nit (or better, the maximum achievable under the constraint of sufficient colorfulness for whatever objects are outside), and sacrifice somewhat on e.g. the specular highlights of that region.

For 1000 nit, he may need to re-grade the bright regions more critically, so he may consider to darken also the inside colors now, to keep the contrast ratio between the average luminance inside and outside sufficiently high. For e.g. 700 nit, the grader may consider that he needs to significantly change all the luminances of the indoors objects, to puzzle together all these differently lit interior regions in the smaller available luminance sub-range, however still considering e.g. local and semi-global contrasts, etc. Of course he may need to look at the outdoors objects luminances again too.

Good technical frameworks for HDR encoding need to give content creators sufficient freedom, given of course also the various scenarios needed on the image consumption side, in particular which allow various ways to re-color all those objects, at least along a luminance axis direction.

Finally, a formatter 330 will encode the single e.g. 2000 nit referred image Im_2000, in any prescribed format according to a chosen video transmission encoding standard for coding the HDR images. We have developed a method in which we can largely re-use existing LDR image coding and communication technology. In the end we just have e.g. normalized RGB values, even for a HDR image, so we can store them in coding formats that don't care about what the pixels actually are (of course the receiver needs metadata explaining what luminances the lumas or non-linear R'G'B' values actually correspond to, or it will, e.g. assuming it receives a legacy LDR image, render the majority of the pixels too dark on displays with lower peak brightness). Typically there may be DCT encoding involved to obtain encoded Im_2000C, since in our research we have shown we can encode HDR images in standard MPEG coding structures (e.g. YCrCb 10 bit), provided the right EOTF is used for defining how the available 1024 codes are used for encoding particular luminances as lumas. Co-communicated with this image there should be all required metadata prescribing (or at least guiding) how derived images (i.e. gradings or looks) should be obtained from Im_2000, such as e.g. the F_2T1 functions to calculate at least one lower dynamic range image (e.g. 100 nit typically), for obtaining final driving images for lower dynamic range displays (e.g. up to 300 nit). The image and metadata can e.g. be put on a BD disk, or encoded as a video transmission coding signal, and sent e.g. over a network connection, or stored for later transmission, etc. In addition to that according to this invention there will be an additional set of metadata MET (F_2Tu), which we will elucidate in this description as the functions F_2Tu to reconstruct a very close approximation of the e.g. Im_5000 nit grading from the Im_2000 nit image stored on the BD disk. So in summary the grading happening with unit 310 is a basic artistic grading, defining however the artist wants a real-life scene to be mapped on a high quality (larger peak brightness) HDR image. The second grading unit 320 is then typically used for, under direction of the grader, mapping this optimal HDR representation to a lower peak brightness HDR image (a trade-off which still has sufficient coding quality of the regions for allowing optimal re-transformation for displays of higher peak brightnesses, but psychovisually with less HDR impact, because the object luminances have been mapped to a lower peak brightness range). Some encoder embodiments may do only that, and then service receiver applications which only need to serve displays and rendering scenarios of higher peak brightness than that which was agreed for the image communication. However, it is typically useful to have information on how to down-grade to lower peak brightnesses too, so typically there will also be the third unit 325, allowing an automatic algorithm or typically also a grader to specify how the 2000 nit images should be down-graded, typically to 100 nit images. Finally all data is formatted according to whatever an agreed storage or communication system needs.

Figure 6:
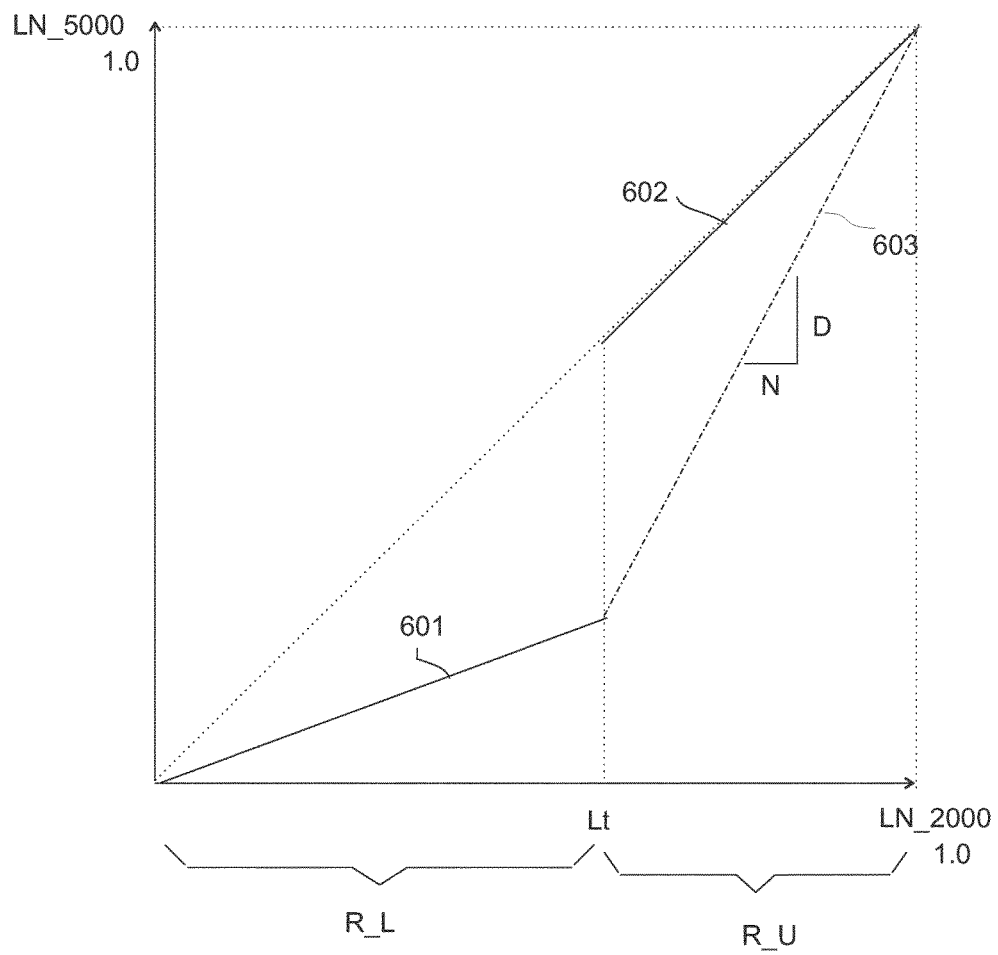
FIG. 6 schematically shows a possible color remapping for going from the 2000 nit grading (encoded in a video signal S_im encoded) to a graded video with maximum luminance 5000 nit, i.e. substantially identical in look to the master grading's maximum at the creator's side and time.

We will now elucidate further some embodiment aspects on what a grader can do regarding the mapping between the 5000 nit and 2000 nit HDR encodings, and which technical aspects the various technical embodiments should have to cater for this. As said before, when not just grading, solely, a Im_2000 nit encoding which has to be used by itself, but also coding with our parametric functional encoding technology a 5000 nit optimal grading Im_5000, the grading to 2000 nit in fact always becomes a balancing act between scene color representation (i.e. the sufficiently precise quantized characterization of all HDR object textures) and on the other hand artistic look, whether the grader realizes and cares about that or not. So a good grading, when optimizing, has to take aspects of both those constraints into account. We will start theoretically with one possible grading method in FIG. 6. Let's suppose we have an HDR image which is composed of two sub-regions with very different illumination (like e.g. an interior, let's say a dark brown pub, and a bright exterior through a window, or the other way around at night: a dark exterior, and a brightly lit e.g. shop window interior, etc.). We will demarcate the two regions at least conceptually with luminance demarcator Lt. In practice one can technically realize and encode the mappings in various equivalent manners, e.g. only specify a complicated mapping for the luminance of Im_2000 above Lt, and a simple multiplicative scaling factor for the luminances below, or specify a single mapping over the entire luminance range of the input Im_2000 to be reconstructed to a 5000 nit grading, etc. The grader has started his content creation in this example by making in his 5000 nit reference look (Im_5000) a nice look for the interior of the pub. He now wants to copy that look to the Im_2000 nit grading to encode and transmit it, i.e. with the same to be rendered luminances, i.e. the same luminances on its reference luminance range. I.e., in that region below Lt, the two gradings will be related by a linear mapping with a scaling factor of 2.5. Of course the skilled reader can understand that the grader may use all kinds of other mappings, e.g. darken some part of the lower sub-range, because then some brown chairs look better on the 2000 nit rendering, compared to what one would do on the 5000 nit rendering/grading, which would e.g. give a small bump on the linear mapping curve 601.

Then the grader can focus on what to do with the colors with the brighter luminances (we will for simplicity assume that the chromaticities of the colors stay the same for both HDR encodings, which means we can elucidate the invention based on luminance behavior, but the skilled reader will understand how it should work with more general color mappings, which may also change e.g. color saturation, or even hue, e.g. a shift towards yellow to emulate sunlight etc.). If this is merely an encoding of the various bright HDR textures, i.e. now ignoring the look requirements of the ideal luminances for these regions, e.g. because they cannot be made perfectly in the 2000 nit anyway, or can be post-processed, etc., one could use partial mapping curve 602 for the remainder of the image, i.e. in this example the normalized LN_2000 luminances are above Lt mapped one-to-one to the same relative/normalized LN_5000 luminances (which will then of course to a colorimeter or photometer look brighter when rendered on the 5000 nit intended display, but the look to the human visual system will depend on inter alia on visual adaptation, and the cognitive interpretation of the images by the human brain). I.e., perhaps the upper part of the outside sunny areas looks brighter on the 5000 nit display, but so it could, and should. And, the brain, though neither knowing nor caring how sunny exactly it would outside, would expect a "considerably brighter" region, at least as far as any display of particular peak brightness allows. So for some types of scene this would not be a bad grading strategy with a reasonable result, although it may look a little counter-intuitive because we have now a discontinuous mapping, though still reversible. Note that the reversibility criterion (i.e. if the grader makes a "lesser quality" 2000 nit coding out of his higher quality 5000 nit grading by applying some functions, on a receiving side those functions should be applied in reverse to reconstruct the 5000 nit grading from the received 2000 nit one) only requires at a transmitting side being able to define some F_2Tu function(s) to map the Im_2000 to the reconstruction Im_5000*, with the property of sufficient visual closeness to Im_5000, and therefore on the elucidation of our embodiments simply assumes the encoder encodes as metadata not the downmapping functions themselves, but rather their inverse F_2Tu (in this case a F_2T5 to reconstruct a 5000 nit grading), which are needed to reconstruct the Im_5000*, and which will typically be monotonically increasing.

Perhaps the grader may want to use other functions, e.g. because there are continuous functions (like multi-linear with adjustable segment positions) in the limited grading tool set. In that case he could choose to use partial mapping 603 for the upper luminances (upper luminance region R_U), and he might e.g. grade Im_2000 so that there are no luminance values present just above Lt, but only in e.g. the last quarter of the input luminance range. He must continuously balance the various requirements though, so if he wants a good 5000 nit grading to be derivable, and especially if he wants to be responsible for the quality of that, he will typically not only check what he is doing on the 2000 nit grading, but also on the reconstructed 5000 nit one. He may e.g. check those side by side, or toggle them on his single display. The toggling will immediately show regions of significant change, although side by side can be used for other kinds of checks (e.g. sub-regions which have been on purpose graded differently, for some additional reason or effect). Furthermore automatic algorithms can do pre-analysis of regions which may be critical according to some visual aspect e.g. banding, which regions may then be blinked in red for the grader to look more critically there. Both images should be HDR, but they will of course be somewhat different HDR looks. The stretching of curve 603, in particular because the Im_5000* images are to be shown on a bright 5000 nit display, may lead to some regions with e.g. banding because of a too high derivative D compared to the number of locally available codes N in the Im_2000 image. The grader may then re-tune his curve to take that into account. E.g., he may lower the slope of the curve a little at least in that region, to get an N-Shaped curve for 603 with a part of lesser slope between parts of higher slope, at least if that is visually acceptable. Or he may shift the curve a little giving it on average a smaller slope, though not as much as 602 (he may visually want to coordinate the step height by determining a pleasing inter-object contrast for the outside regions compared to the inside, e.g. to limit the light bleeding around the window borders into the pub interior), etc. Or, an automatic algorithm may do that for him. In that case, some technically graded image Im_2000T may be stored on disk, and then there will typically be further mapping parameters, e.g. a F_2T2T which derives from the Im_2000T the artistic grading Im_2000 as it was desired by the grader.

Figure 7:
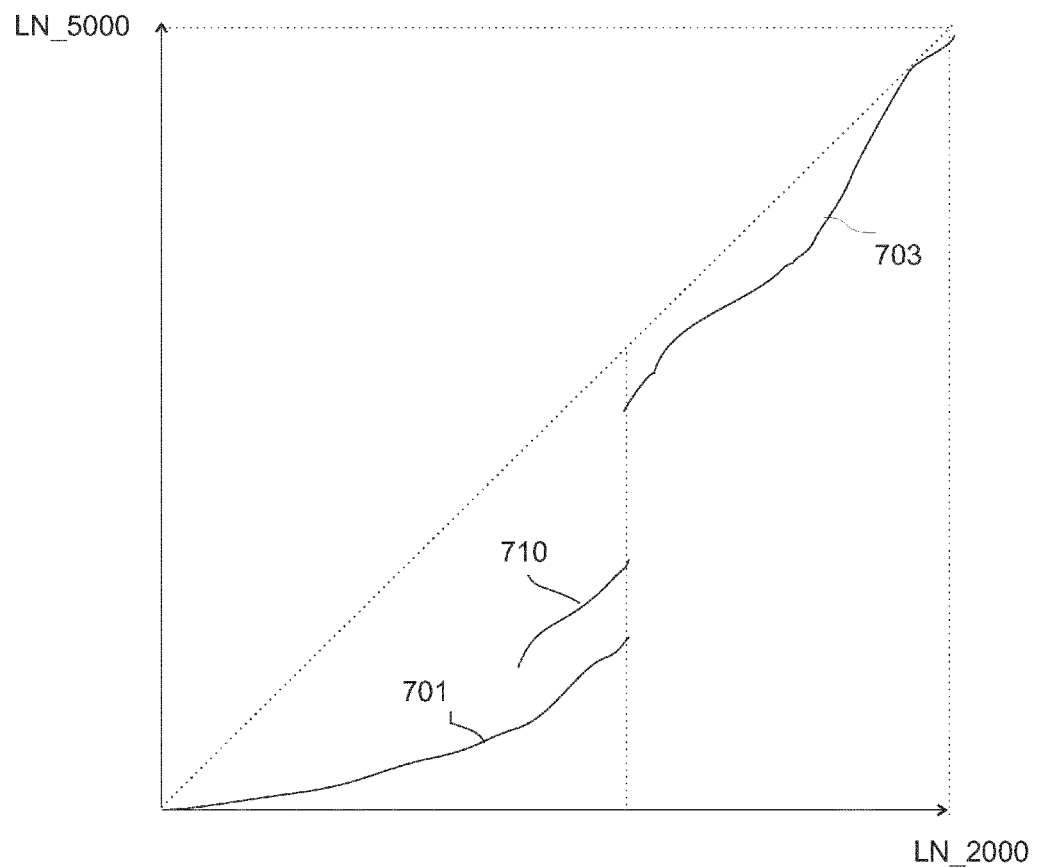
FIG. 7 schematically shows another color remapping example for going from 2000 nit referenced video 5000 nit referenced video, e.g. for supplying to a display of peak brightness around 5000 nit, or storing this higher quality video for later use.

FIG. 7 schematically shows some general example of what the grader may do to relate the two brighter and dimmer HDR gradings by a functional transformation. Instead of exact reproduction of the lower luminance interior regions, he may put some additional grading effect in one of the two looks, because he thinks that looks better in 5000 nit, or is an optimization in the smaller range of 2000 nit, etc. E.g. he may bend the 701 mapping part a little more to the darks, if he thinks e.g. that typical 5000 nit displays can render the dark parts (or at least the relative dark parts, but maybe also the absolute dark parts, with ultra-HDR displays rendering e.g. down to 0.005 or even a theoretical 0.0001 instead of 0.01 nit) better, i.e. he may bring in some extra darkness look, which may e.g. help in images in horror movies of dark basements or caves, or nightly forests, etc.

Similarly he may curve his upper partial mapping curve 703 to bring some more contrast and emphasize certain luminance sub-regions thereof, or vice versa de-emphasize etc. We have also shown an example of local grading. I.e. although normally for all pixels in the image Im_2000 curve 701 would be used, purely based on the pixel's luminance and not on spatial position, in the example curve 710 is used for some local regions/object (e.g. a second view on the bright outside world through a smaller window surrounded by relatively dark parts of the interior). This means in addition to the color processing function shape specifying data some localization information will be communicated to enable the receiver to determine to which pixels in the images 710 should be applied. This may be done e.g. because some particular object is given an additional non-average boost to make it look better, e.g. in Im_2000, which needs to be mitigated to not become over-excessive. Or also, because of the local-adaptive nature of human vision, one may see that a small piece of sky seen through a small opening in dark interior walls may be perceived of different color than the bigger rest of the sky at another position in the image, despite of both being colorimetrically exactly the same, and this may be corrected by local processing specification. Or it may just be used because the grader finds it advantageous for some part of a shot to specify local processing rather than to keep tinkering with the global curves, etc. All these required mapping functions are what we denote schematically for simplicity with F_2Tu, and all this required parameter and other data will be suitable encoded as metadata in a pre-standardized manner so that it can be understood by a receiver. Note that the grader may even in principle desire to co-encode how to map from the 5000 nit Im_5000* to even higher peak brightness displays, which functions F_5TE may e.g. prescribe leveling off to make certain big regions like whitish cloudy sky never too bright even when sunlit, but make small lights extremely bright etc. These functions may be recalculated and stored on disk to directly calculate from the Im_2000 to e.g. a 20,000 nit grading. Of course the grader may also consider that the Im_5000 nit image is the brightest he cares about, and leave further boosting if ever to the tastes of the television maker, or STB maker, or any receiving end image conversion apparatus.

The encoding of the required color processing function metadata in the image signal S_im, e.g. for storage on say an optical disk, or for some television standard, may e.g. happen in a HDR image grading processing definition segment with a particular indicator code value indicating that this is such a type of information, and parameters, encoding the processing situation, in particular the shape of the needed color mapping functions. A descriptor may encode the required processing on the one hand, and the definition of the 2000 nit video on the other hand. E.g. the definition of what display peak brightness the images as graded are optimally suited for may be:

```
Video_Type_definition_descriptor( )
{ Peak Luminance of codec reference range
  EOTF
}
```

The peak luminance written to BD would in our elucidating example be 2000 nit, and the EOTF would be defined in the bluray spec (as a mathematical function or LUT), as whatever single or multiple variant(s) they prescribe, the multiple case e.g. using an integer number to denote which one is used.

Of course one could also fill in 3000 nit e.g., and enforce some 3000 nit coding in the specified 2000 nit definition (i.e. using the EOTF for 2000 nit encoding), but usually one would follow the specification.

The processing to reconstruct the Im_5000* could be defined e.g. as:

```
Video_processing_descriptor( ){
Characterizing type #2000_to_5000
K    number of linear segments for luma mapping
    For (i=0; i<K;i++) {(LN_2000_i, LN_5000_i)} coordinates of the partial
segment end point, with LN_2000_i being an x-coordinate and LN_5000_i an y-coordinate
of e.g. an start point of a segment, the last start point being an end point if LN_2000_i has
its maximal value (typically 1)
L    number of linear segments for luma-dependent saturation multiplier
For (j=0; j<L;j++) {(LN_2000_j, MULT_SAT_i)} coordinates of a luminance (or luma)
point along the axis starting or ending the present linear segment, and in the y-direction a
saturation boost value a multiplier, e.g. 0.3 or 3.5 [n.b. we can encode this graph by scaling
a standard range e.g. 0.25-3.0 along which linearly or non-linearly the e.g. 8bit =225
possible values are distributed as MULT_SAT=f(mult_sat_code)= e.g. A*mult_sat_code+B,
with a SAT_SCAL_FACTOR of e.g. 2.0, so that we can encode saturations up to 2.0*3.0]
}
```

From this metadata (in the simpler HDR coding scenarios) the receiving side has now all information it needs. Namely, it gets confirmation of how Im_2000 was specified, i.e. what it means colorimetrically, as a device-independent (yet partially optimized for a class of rendering scenarios, by already optimally grading the HDR effects to a certain HDR display capability) encoding, which can be further tuned if required to fulfill device-specific needs. Also the decoder can read the processing functions and load them in its color processing unit.

Figure 4:
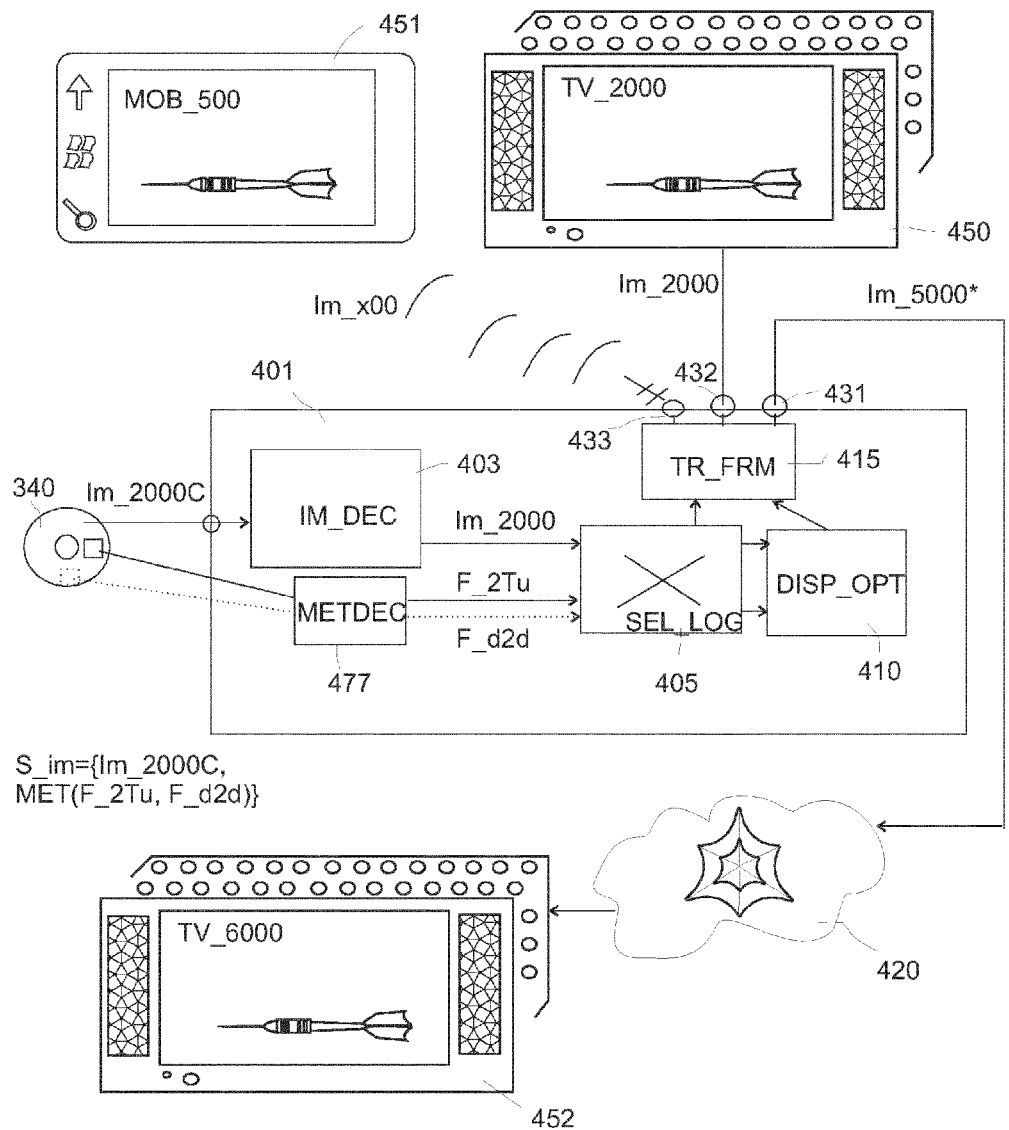
FIG. 4 schematically shows a possible receiving side decoding and HDR image using system, allowing to use an optimally graded video to each connected display based on at least the display peak brightness, and possibly other factors like viewing surround, viewer preferences, etc.

FIG. 4 schematically elucidates a HDR image (or video) decoder 401 (which may e.g. be an IC or processing board or software running on a processor in such apparatus like a TV, a STB with BD reader, a computer, a medical image receiving station, etc.) at a receiving end in an exemplary consumer home rendering configuration (of course the reader understands that mutatis mutandis our embodiments can also be embodied in professional systems, like e.g. digital cinema for movie theaters).

The image signal S_im is e.g. read from a bluray disk 340, yielding as a starting image the compressed image Im_2000C, on which image decompressor 403 decompresses the image(s) into an uncompressed image(s) by performing e.g. run length decoding, inverse DCT etc., to obtain e.g. a linear luminance CIE (X,Y,Z) encoded Im_2000. In addition to that, the various metadata processing functions are read e.g. from the same disk, and/or a secondary source of metadata, e.g. a function F_d2d to obtain a 100 nit look image from the Im_2000, and in particular interesting for elucidating various embodiments of the present invention the F_2Tu function(s) to reconstruct Im_5000*. A logic processor 405 determines what the particular configuration is of say the settopbox (STB) with its internal decoder, in particular which display(s) are currently connected (and it may further analyze further aspects of the rendering environment like e.g. the average viewing surround illuminance, viewing preferences which viewer(s) have stored into the system via their remote control, etc.). In case (only) a 2000 nit display 450 is connected presently, the logic processor may directly relay the unprocessed (because already most optimal artistically for such a display) Im_2000 video to it. This will typically go via a transmission formatter 415, which may further (although it needn't per se do any colorimetric processing) format the images to be compliant with any particular video transmission (or storage if a memory is connected and fed with video) standard. E.g., display 450 may be connected via a cable connection output 432, e.g. a HDMI connector, compliant with a sufficiently HDR-capable version of HDMI. In case the metadata is transmitted—e.g. as useful information to allow the display to do its own final colorimetric finetuning processing—this metadata may be transmitted in an agreed format in the HDMI spec. At the same time however, the STB may service e.g. a portable display 451, say of a mobile phone or tablet. This may happen e.g. by sending an x*100 nit optimized image via a wireless connection, via wireless output 433 (e.g. by streaming video over an 802.11 Wifi protocol, or similar). Of course, this portable display of significantly lower dynamic range capabilities, say peak brightness 500 nit, has to be fed with a processed signal with a different color/brightness look, i.e. a differently graded image. Thereto, a color processing unit 410 will take the information from the correct processing function F_d2d to obtain the appropriate grading, e.g. typically by applying those functions to Im_2000 (and logic processor 405 will transmit the required data, i.e. Im_2000 and F_d2d. So the color processing unit 410 is arranged to calculate for each scenario (i.e. whatever the peak brightness of the received encoded image, and whatever the peak brightness of a display on which the re-graded images are shown) the appropriate colorimetric transformations, either by directly applying the received functions, or by determining suitable color mapping functions on the basis of the re-grading information as encoded in the received functions, to obtain correctly graded output images, and will then transmit the correctly graded e.g. 100 nit image to the transmission formatter 415 (either directly or via logic processor), or a 3200 nit image, etc. The transmission formatter 415 will hence do any reformatting needed for the required information to be communicatable to the connected display, i.e. at least send the images according to some pre-agreed image encoding protocol (e.g. store a 850 nit image in an LDR image coding container), and it may also communicate all or some of the color mapping functions in metadata.

The logic processor 405 can determine if and what color processing is needed, e.g. to convert a 1000 nit-referred decoded video of images into images for a 1500 nit display.

Thereto, the creator may encode what rendering situation the color mapping functions F_d2d are for, which may be done as:

```
Mapping_function_meaning{
Starting_max_luminance 2000 nit
Optimal_max_luminance 100 nit [i.e., the mapping
is meant to create appropriately graded
driving images for 100 nit displays, "on average"]
Upper_limit_max_luminance 500 nit
Lower_limit_max_luminance 40 nit
}
```

The last two parameters are not needed in all embodiments (which will typically only encode at least to which intended peak brightness of a display the function re-grades, assuming the peak brightness of the communicated images is pre-fixed, and typically it may also be useful to fill in that encoding peak brightness, here call Starting_max_luminance), but it may be useful to convey limits for the appropriateness of the look, so that a receiver can quickly decide whether it needs to re-grade the images for its connected display.

I.e., if the content creator fills in not only the optimal output max. luminance, but also the limits, he defines what according to him is in this example a LDR display for which the color mapping starting from the Im_2000 is usable, more precisely, he warrants that when using the image [i.e. even if the display itself does no improvement processing of its own but directly renders this LDR grading Im_100] on displays around 100 nit up to e.g. 500 nit, the image will still look reasonable and e.g. not too bright. He may have seen e.g. that the image is not too dark, and can still be rendered with sufficient visual quality on 50 nit displays, but below 40 nit e.g. the dark regions become too dark to easily watch for the average viewer, at least according to the judgment of the grader. This may facilitate for a display, or the logic processor, to estimate which of various possible functions to use for prediction of e.g. an Im_750 for a 750 nit display. This may be e.g. a F_2000T400 function and not a F_2000T1000 function, or, the display may use both predictions, and interpolate appropriately. These limits specify for which dynamic range looks on a HDR scene the grader's artistic rendering choices are valid, versus in which cases other optimization of the various average object luminances along the range are better.

A third example is when the owner or user of the STB has available a high end HDR display, e.g. with peak brightness of 6000 nit. This being sufficiently close to 5000 nit, it can be fed the Im_5000* graded images, and then directly render them a little suboptimally, or alternatively do its own 5000-to-6000 color processing. In this example the signal goes via an output 431 feeding into the internet 420 (or this could be a local network etc.). The skilled person will understand that various third parties, or additional technical components may be involved via the internet, e.g. the user may get the required F_2Tu functions to the display via a third party over the internet in case display 452 does the 2000-to-5000 conversion if its fed with the Im_2000 signal (instead of an already display-optimized image), etc.

Figure 8:
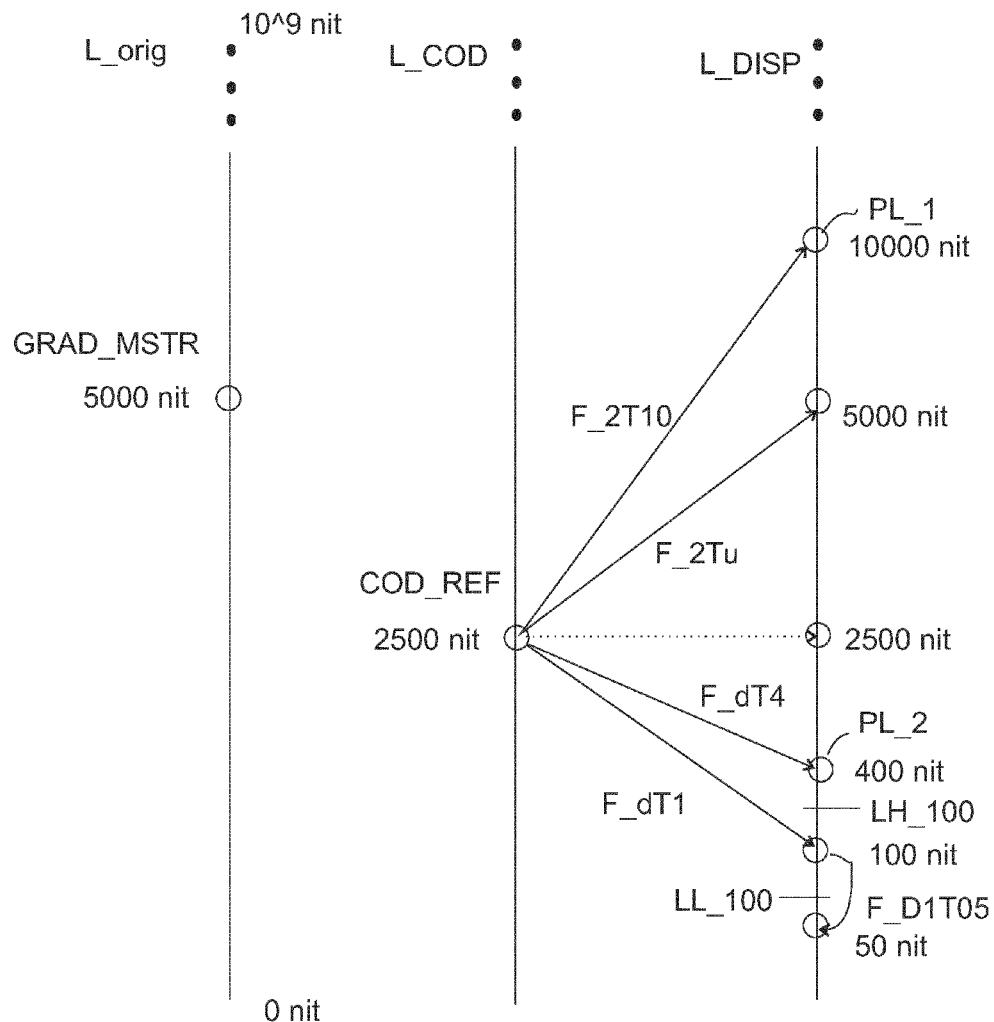
FIG. 8 schematically shows how the below described technology can be used to encode HDR images of any original quality (i.e. any maximum luminance of the GRAD_MSTR, e.g. 5000 nit or 15000 nit) to be used on displays of any peak brightness or dynamic range capability, by being encoded for transmission by a HDR codec of significantly reduced dynamic range capabilities, i.e. a maximum luminance L_MAX_C of e.g. 2000 nit, or 1200 nit, etc., but of course a still high enough maximum luminance for the encoded image(s) to still be a HDR encoding, i.e. above 900 nit associated reference display peak brightness minimally.

Because there are so many variables in our encoding framework (because we now want to be able to handle various kind of LDR or HDR video capturing, with various codec definitions with different reference luminance ranges for the codec gamut, and be able to supply optimal images for various kinds of display), FIG. 8 schematically summarizes some aspects of the invention again.

So what the grader has internally in his grading apparatus on the creation side, e.g. in some linear luminance encoding, e.g. a set of OpenEXR images or something, not yet optimized for video transmission, is on the left axis: L_orig. As said, the pixel luminances in this master grading image are not per se the luminances in the actual scene, but this image codifies the end result from how they have been captured with say a rig of two differently exposed ARRI cameras, and have then be suitable graded to serve the majority of HDR displays in a not too far future (of course that grading could in some examples be simple as what the camera-man configures on his camera). We gave as elucidating example where the grader chooses a reference luminance range maximum luminance of 5000 nit, e.g. because that was the best reference display he could get his hands on, and he cannot see brighter luminances anyway. So if a consumer with sufficient money buys the same display, he should be able to see that original grading ("director's version"). What is ultimately rendered (not saying anything yet about in-between coding choices) is shown on the L_DISP axis, which shows how displays render the luminances as output luminances, in particular simplified with their rendering of peak white (e.g. R'=G'=B'=1023).

However, this chain now goes via a significantly lower codec max. luminance value (seen on the L_COD axis of possible standardized luminance maxima of the gamut of the coding, which as said should not be confused with the gamuts/ranges of respectively the image/camera, and display on either side), namely the codec was so defined to have a peak luminance (L_MAX_C) of e.g. 2500 nit, and we have to do all coding to get the correct pipeline communication taking that into account. As said, when transmitting this Im_2500 set of video images over e.g. a DVB or ATSC communication, we can co-supply various color mapping function sets, e.g. F_2T10, which the receiving side color processing unit can apply to derive e.g. a 10,000 nit optimally graded image starting from the Im_2500. These functions may also be specified indirectly, e.g. F_D1T05 maps to a 50 nit video, for displays with peak brightnesses around 50 nit, but starting from a color mapped 100 nit one calculatable at the receiving side rather than directly from the Im_2500.

The video signals can be communicated in several ways, e.g. on a memory product such as e.g. a blu-ray disk (340) or a solid state memory product comprising a video signal (S_im) comprising an encoded high dynamic range video (Im_2000) with a maximum luminance (L_MAX_C) between 900 nit and 3500 nit, and preferably 2000 nit or 1000 nit, and a color mapping specification (F_2Tu) comprising at least a luminance mapping function for deriving by applying a color mapping on the encoded high dynamic range video (Im_2000) a second video with pixels having a maximum luminance which is higher than the maximum luminance (L_MAX_C), and preferably at least 1.25 times higher. The memory product optionally comprises at least one further color mapping specification (F_d2d), and optionally comprises at least one limit of display peak brightness (LH_100, LL_100) usable for indicating for which range of displays the encoded high dynamic range video (Im_2000) or any video calculated therefrom by color processing is visually optimal. Visually optimal means that the image looks most suitable (according to the content creator/grader) when rendered directly without further color processing (except perhaps minor processing like e.g. change of RGB basis matrixing) on a display with peak brightness within that range, while e.g. on a darker display some of the images may contain regions which are too dark to be easily seen, or are judged ugly, etc. In particular, the grader may have made colorimetrically precise HDR effects, and may so prescribe that those are best seen on e.g. a display of peak brightness between 1000 and 2000 nit, and that on e.g. 500 or 4000 nit another respective color processing must be done, giving the region a somewhat different look, which renders the HDR more suitable on such a different dynamic range capability display.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

A computer program product version of the present embodiments as denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. It should be clear that with computer we mean any device capable of doing the data computations, i.e. it may also be e.g. a mobile phone. Also apparatus claims may cover computer-implemented versions of the embodiments.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An encoder for encoding an input high dynamic range video comprising a set of images, having pixel colors with luminances lower than or equal to a first maximum luminance, into an encoded high dynamic range video, the encoder comprising:

a re-grading unit arranged to allow a content creator to specify at least a tone mapping function for color mapping the encoded high dynamic range video of lower second maximum luminance to a high dynamic range video reconstruction (Im_5000*) of the high dynamic range video;

wherein the re-grading unit is arranged to apply the inverse of the tone mapping function to the set of images to obtain the encoded high dynamic range video; and a formatter, arranged to write into a video signal the encoded high dynamic range video, and as metadata the at least one tone mapping function, and wherein the re-grading unit is further arranged to use a limited set of re-grading functions that are substantially visually reversible grading functions.

2. An encoder for encoding an input high dynamic range video as claimed in claim 1, in which the re-grading unit is arranged to allow a specification of the mapping function comprising a color mapping specification which applies an arbitrary shaped monotonically increasing tone mapping, and a luminance-dependent saturation multiplication function, which functions are to be used in a color processing which applies the corresponding luminance and saturation change while keeping the same hue for the pixel color in the output images of the high dynamic range video reconstruction (Im_5000*) as in the input images of the encoded high dynamic range video.

3. An encoder for encoding an input high dynamic range video as claimed in claim 1, comprising a further grading unit arranged to specify at least one further color mapping function specifying how to color map the encoded high dynamic range video into a third video which is brightness-optimized for rendering on a display with a peak luminance which is different from the first maximum luminance and the second maximum luminance.

4. An encoder for encoding an input high dynamic range video as claimed in claim 3, wherein the further grading unit is arranged to specify the least one further color mapping function being a color mapping function for obtaining a 100 nit video from the encoded high dynamic range video.

5. An encoder for encoding an input high dynamic range video as claimed in claim 1, comprising a limit specification unit arranged to allow a content creator to specify at least one limit of display peak brightness identifying a subset of displays which have a peak brightness in a range of peak brightnesses for which the encoded high dynamic range video, or any video derived therefrom by applying a further color mapping, is of sufficient visual quality according to the content creator.

6. An encoder for encoding an input high dynamic range video as claimed in claim 1, wherein substantially reversible comprises the ability to calculate a mathematical inverse of the applied function or remapping procedure from 5000 nit HDR to 2000 nit HDR.

7. An encoder for encoding an input high dynamic range video as claimed in claim 1, wherein the luminance of any pixel in the encoded high dynamic range video is less than or equal to a second maximum luminance being at least 900 nit, and the first maximum luminance being at least two times the second maximum luminance.

8. A method of encoding an input high dynamic range video comprising a set of images, having pixel colors with luminances lower than or equal to a first maximum luminance, as an encoded high dynamic range video, the method comprising:

specifying, by a content creator, a color mapping comprising at least a tone mapping function for color mapping the encoded high dynamic range video of lower second maximum luminance to a high dynamic range video reconstruction (Im_5000*) of the high dynamic range video;

specifying, by the content creator, the tone mapping function via a re-grading unit, whereby the re-grading unit uses a limited set of re-grading functions to apply an inverse of the tone mapping function to the set of images to obtain the encoded high dynamic range video, and wherein the limited set of re-grading functions are substantially visually reversible grading functions, and writing into an video signal the encoded high dynamic range video pixel color data and as metadata the at least one tone mapping function.

9. A method of encoding an input high dynamic range video comprising a set of images, having pixel colors with luminances lower than or equal to a first maximum luminance as claimed in claim 8, wherein the luminance of any pixel in the encoded high dynamic range video is less than or equal to a second maximum luminance being at least 900 nit, and the first maximum luminance being at least two times the second maximum luminance.

10. A video decoder for decoding a high dynamic range video comprising a set of images with pixels having luminances with values up to a first maximum luminance, the high dynamic range video being encoded as an encoded high dynamic range video, the decoder comprising:

a video decompressor arranged to read from a video signal compressed image data and decompress it to obtain the encoded high dynamic range video;

a metadata reading unit arranged to extract at least one color mapping specification from the video signal, wherein the extracted color mapping specification specifies an arbitrary shaped monotonically increasing tone mapping function, the inverse of which is applied by a re-grading unit at a video encoder to a set of images to obtain the encoded high dynamic range video, wherein the re-grading unit uses a limited set of re-grading functions that are substantially visually reversible grading functions; and a color processing unit arranged to apply the color mapping specification to the encoded high dynamic range video to obtain a reconstructed high dynamic range video (Im_5000*) with a third maximum luminance at least two times higher than the second maximum luminance.

11. A video decoder for decoding a high dynamic range video set of images as claimed in claim 10, in which the third maximum luminance is equal to the first maximum luminance.

12. A video decoder for decoding a high dynamic range video set of images as claimed in claim 10, comprising a logic processor arranged to determine which at least one display having which peak brightness is connected and needs to be supplied with video, and to determine based on the peak brightness of that at least one display which color processing is to be applied to the encoded high dynamic range video, to obtain an output image for transmission to the display.

13. A video decoder for decoding a high dynamic range video set of images as claimed in claim 12, characterised in that the logic processor is further arranged to read from the video signal at least one limit of display peak brightness, and determine which color processing is to be applied based on the at least limit of display peak brightness.

14. A video decoder for decoding a high dynamic range video set of images as claimed claim 10, characterized in that the color processing unit arranged to derive a 100 nit maximum luminance video from the encoded high dynamic range video by applying a color transformation received in the video signal.

15. A video decoder for decoding a high dynamic range video comprising a set of images with pixels having luminances with values up to a first maximum luminance according to claim 10, wherein the luminance of any pixel in the encoded high dynamic range video is less than or equal to a second maximum luminance being at least 900 nit, and the first maximum luminance being at least two times the second maximum luminance.

16. A method of video decoding of a high dynamic range video set of images with pixels having luminances decodable up to a first maximum luminance, the high dynamic range video being encoded as an encoded high dynamic range video, the method comprising:
    reading from a video signal and decompressing the encoded high dynamic range video;
    extracting at least one color mapping specification from the video signal, wherein the color mapping specification extracted from said metadata specifies an arbitrary shaped monotonically increasing tone mapping function, the inverse of which is applied by a re-grading unit at a video encoder to the set of images to obtain the encoded high dynamic range video, wherein the re-grading operation uses a limited set of re-grading functions that are substantially visually reversible grading functions; and
    applying the color mapping specification to the encoded high dynamic range video to obtain a reconstructed high dynamic range video (Im_5000*) with a third maximum luminance which is at least two times higher than the second maximum luminance.

17. A method of video decoding of a high dynamic range video set of images with pixels having luminances decodable up to a first maximum luminance according to claim 16, wherein the luminance of any pixel in the encoded high dynamic range video is less than or equal to a second maximum luminance being at least 900 nit, and the first maximum luminance being at least two times the second maximum luminance.

* * * * *